US006067510A

United States Patent [19]

[11] Patent Number: 6,067,510
[45] Date of Patent: May 23, 2000

Kimura et al.

[54] MACHINE INTERPRETER WHICH STORES AND RETRIEVES TRANSLATED SENTENCES BASED ON VARIABLE AND INVARIABLE SENTENCE PORTIONS

[75] Inventors: Kozue Kimura, Yamatokoriyama; Yukihiro Kubo, Soraku-gun; Satoshi Onishi, Nara, all of Japan

[73] Assignee: Sharp Kabushiki Kaisha, Osaka, Japan

[21] Appl. No.: 08/821,576

[22] Filed: Mar. 19, 1997

[30] Foreign Application Priority Data

Mar. 18, 1996 [JP] Japan .................................... 8-061263

[51] Int. Cl.[7] ........................................ G06F 17/28
[52] U.S. Cl. ........................................ 704/7; 704/2
[58] Field of Search .................................... 704/2–7, 277; 345/352, 356; 707/536

[56] References Cited

U.S. PATENT DOCUMENTS 4,468,754 8/1984 Asada et al. ................................ 704/5
4,597,055 6/1986 Hashimoto et al. ........................ 704/2
4,685,060 8/1987 Yamano et al. ............................ 704/5
5,010,486 4/1991 Suzuki et al. .............................. 704/4
5,020,021 5/1991 Kaji et al. .................................. 704/4
5,214,583 5/1993 Miike et al. ............................... 704/5
5,267,156 11/1993 Nomiyama ................................ 704/2
5,373,442 12/1994 Kutsumi et al. .......................... 704/3
5,412,712 5/1995 Jennings ..................................... 704/2
5,477,450 12/1995 Takeda et al. ............................ 704/2
5,523,943 6/1996 Maruta et al. ............................. 704/4
5,541,838 7/1996 Koyama et al. ........................... 704/3
5,640,575 6/1997 Maruyama et al. ....................... 704/2

FOREIGN PATENT DOCUMENTS 61-16117 4/1986 Japan .

*Primary Examiner*—Forester W. Isen
*Assistant Examiner*—Patrick N. Edouard

[57] ABSTRACT

A machine interpreter and method provides a structure in which words are sorted and hierarchically displayed as candidates for substitution in particular order by the display. The words are prestored in variable and invariable word groups. The words of a variable word group are displayed, a word is selected, and a translation takes place based on an invariable word group of an input sentence and the selected word. Consequently, a time for retrieving the words can be reduced.

8 Claims, 17 Drawing Sheets

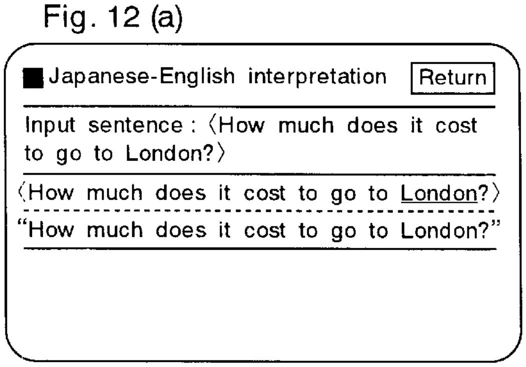

Fig. 12 (a)

■ Japanese-English interpretation [Return]

Input sentence : 〈How much does it cost to go to London?〉

〈How much does it cost to go to London?〉
"How much does it cost to go to London?"

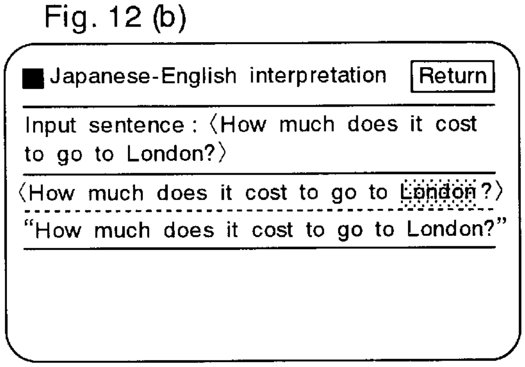

Fig. 12 (b)

■ Japanese-English interpretation [Return]

Input sentence : 〈How much does it cost to go to London?〉

〈How much does it cost to go to London?〉
"How much does it cost to go to London?"

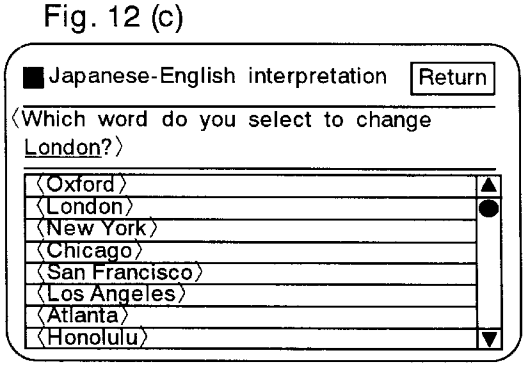

Fig. 12 (c)

■ Japanese-English interpretation [Return]

〈Which word do you select to change London?〉

| 〈Oxford〉 | ▲ |
| 〈London〉 | ● |
| 〈New York〉 | |
| 〈Chicago〉 | |
| 〈San Francisco〉 | |
| 〈Los Angeles〉 | |
| 〈Atlanta〉 | |
| 〈Honolulu〉 | ▼ |

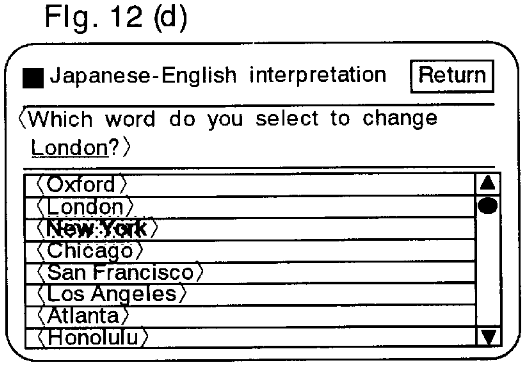

Fig. 12 (d)

■ Japanese-English interpretation [Return]

〈Which word do you select to change London?〉

| 〈Oxford〉 | ▲ |
| 〈London〉 | ● |
| 〈New York〉 | |
| 〈Chicago〉 | |
| 〈San Francisco〉 | |
| 〈Los Angeles〉 | |
| 〈Atlanta〉 | |
| 〈Honolulu〉 | ▼ |

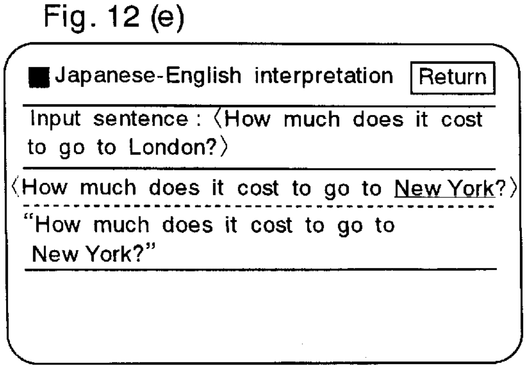

Fig. 12 (e)

■ Japanese-English interpretation [Return]

Input sentence : 〈How much does it cost to go to London?〉

〈How much does it cost to go to New York?〉
"How much does it cost to go to New York?"

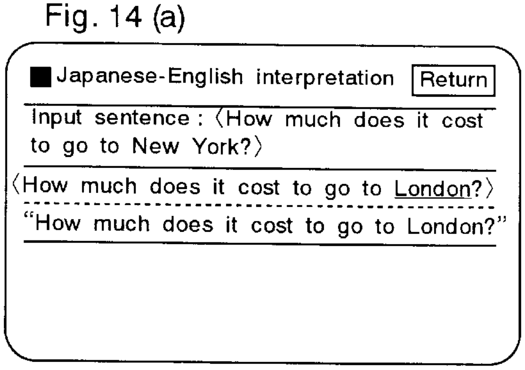

Fig. 14 (a)

■Japanese-English interpretation [Return]

Input sentence : 〈How much does it cost to go to New York?〉

〈How much does it cost to go to London?〉

"How much does it cost to go to London?"

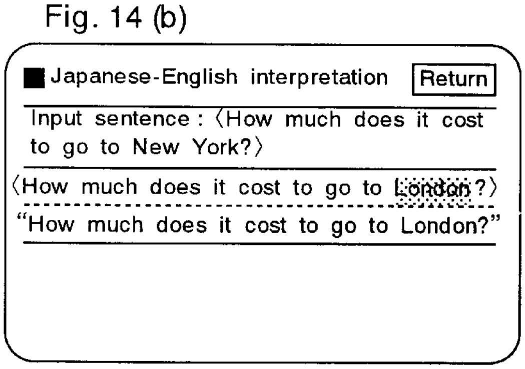

Fig. 14 (b)

■Japanese-English interpretation [Return]

Input sentence : 〈How much does it cost to go to New York?〉

〈How much does it cost to go to London?〉

"How much does it cost to go to London?"

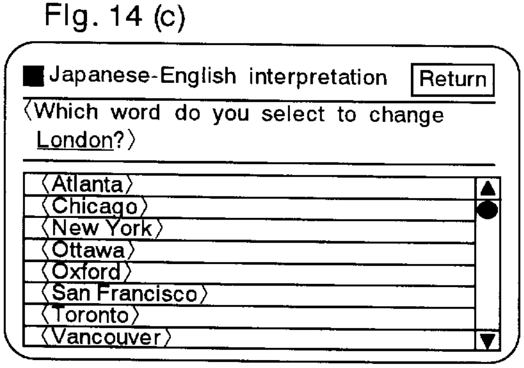

Fig. 14 (c)

■Japanese-English interpretation [Return]

〈Which word do you select to change London?〉

| 〈Atlanta〉 |
| 〈Chicago〉 |
| 〈New York〉 |
| 〈Ottawa〉 |
| 〈Oxford〉 |
| 〈San Francisco〉 |
| 〈Toronto〉 |
| 〈Vancouver〉 |

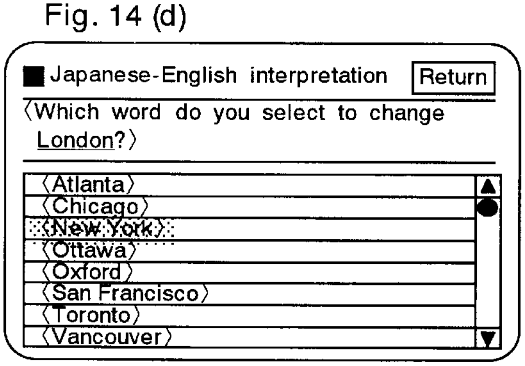

Fig. 14 (d)

■Japanese-English interpretation [Return]

〈Which word do you select to change London?〉

| 〈Atlanta〉 |
| 〈Chicago〉 |
| 〈New York〉 |
| 〈Ottawa〉 |
| 〈Oxford〉 |
| 〈San Francisco〉 |
| 〈Toronto〉 |
| 〈Vancouver〉 |

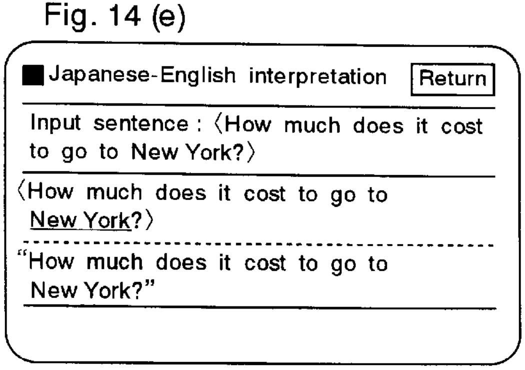

Fig. 14 (e)

■Japanese-English interpretation [Return]

Input sentence : 〈How much does it cost to go to New York?〉

〈How much does it cost to go to New York?〉

"How much does it cost to go to New York?"

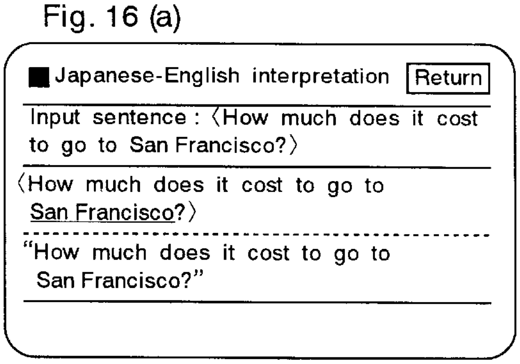

Fig. 16 (a)

■ Japanese-English interpretation [Return]

Input sentence : 〈How much does it cost to go to San Francisco?〉

〈How much does it cost to go to San Francisco?〉
-------------------------------------------------
"How much does it cost to go to San Francisco?"

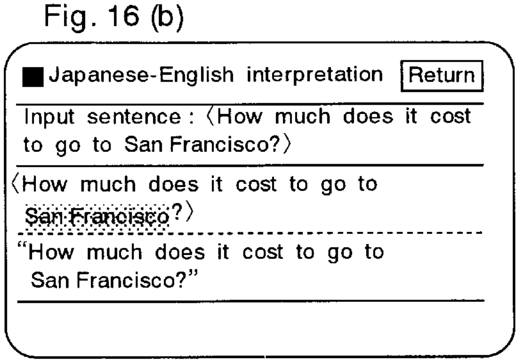

Fig. 16 (b)

■ Japanese-English interpretation [Return]

Input sentence : 〈How much does it cost to go to San Francisco?〉

〈How much does it cost to go to San Francisco?〉
-------------------------------------------------
"How much does it cost to go to San Francisco?"

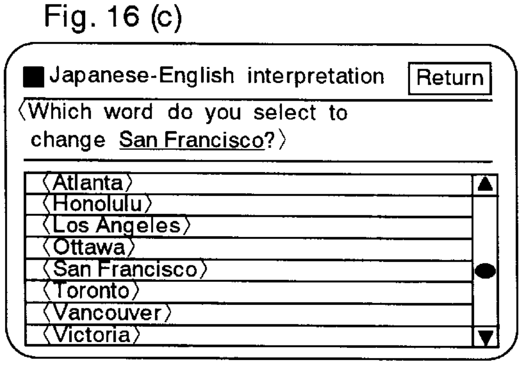

Fig. 16 (c)

■ Japanese-English interpretation [Return]

〈Which word do you select to change San Francisco?〉

| 〈Atlanta〉 |
| 〈Honolulu〉 |
| 〈Los Angeles〉 |
| 〈Ottawa〉 |
| 〈San Francisco〉 ● |
| 〈Toronto〉 |
| 〈Vancouver〉 |
| 〈Victoria〉 |

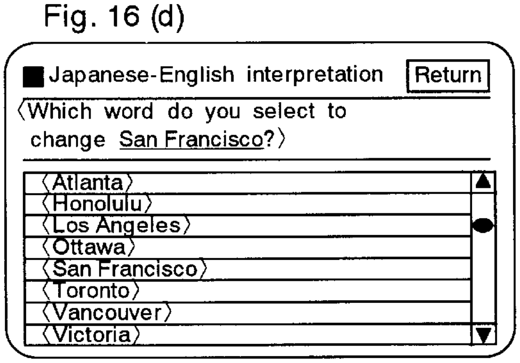

Fig. 16 (d)

■ Japanese-English interpretation [Return]

〈Which word do you select to change San Francisco?〉

| 〈Atlanta〉 |
| 〈Honolulu〉 |
| 〈Los Angeles〉 ● |
| 〈Ottawa〉 |
| 〈San Francisco〉 |
| 〈Toronto〉 |
| 〈Vancouver〉 |
| 〈Victoria〉 |

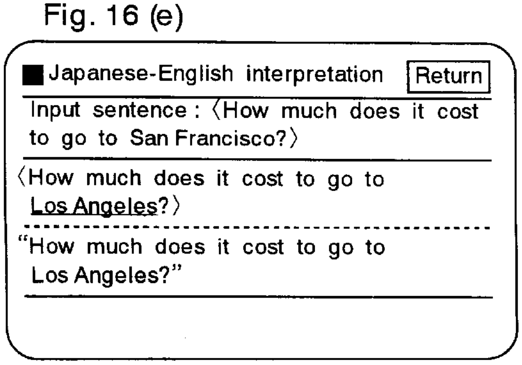

Fig. 16 (e)

■ Japanese-English interpretation [Return]

Input sentence : 〈How much does it cost to go to San Francisco?〉

〈How much does it cost to go to Los Angeles?〉
-------------------------------------------------
"How much does it cost to go to Los Angeles?"

MACHINE INTERPRETER WHICH STORES AND RETRIEVES TRANSLATED SENTENCES BASED ON VARIABLE AND INVARIABLE SENTENCE PORTIONS

BACKGROUND OF THE INVENTION

1. Field of the Invention

The present invention relates to a machine interpreter and more particulary to an interpreter for storing example sentences and parallel translated sentences thereof in pairs and for displaying appropriate parallel translated sentences according to a user's request for retrieval.

2. Description of the Related Art

Currently, a lot of glossaries of conversation examples having many conversational expressions have been published. A conversational sentence interpreter has been proposed which electronically converts these glossaries of conversation examples, selects a conversation example sentence by key operation or the like, and displays a translated sentence for the selected conversation example sentence.

For example, it is also possible to exchange in a variant part and display a part of words in addition to a simple display of example sentences. Also in the case where there is only one sentence "Do you have a single room?", "single" can be changed to "double" and "twin" to obtain parallel translated sentences. As a matter of course, words for the parallel translated sentence can be exchanged in the variant part and displayed.

Thus, in the case where the word should be exchanged in the variant part, the position of a word which can be changed is underlined to inform a user that the same word can be changed, and the user selects a word to be changed if necessary. Consequently, the word is exchanged. If the number of candidates of words is great, a screen is scrolled or pages are turned over to search for a desired word.

However, also in case where the number of words which can be inserted in the variant part is 20 to 30 or more, the words are displayed on a flat list. For this reason, the user should look at all words until a desired word is obtained. Consequently, it takes much time and labor. In addition, the words are not displayed in order. Therefore, the user should look at all the words to search for a desired word. Consequently, it takes much time and labor.

In many cases, the word to be inserted in the variant part is greatly related to a word which has been inserted from the beginning. Accordingly, in case where the words which can be inserted in the variant part are arranged in meaningful order in a dictionary, there is a good possibility that both elements are described adjacently. However, the list of words always begins with a first element described in the dictionary. For this reason, the user should look at words in order from the first one. Therefore, it is hard to search for the desired word. Effective information cannot be utilized.

Furthermore, in case where the desired word is not prepared, there is no other alternative. A sentence in which only a part of words are different, is of no use to the user even if it is prepared. In particular, this becomes a problem in a variant part in which a proper noun, and numerals such as quantity, price, time, telephone numbers and the like can be inserted.

In an electronic interpreter which has been described in Japanese Patent Publication No. SHO 61(1986)-16117 according to the prior art, a user searches for words in an order which can be inserted in a variant part and selects a desired word when changing the variant part in an example a sentence. Therefore, it takes plenty of time and labor.

SUMMARY OF THE INVENTION

In order to solve the above-mentioned problems, the present invention provides a machine interpreter which can sort and display words hierarchically in a particular order when displaying the words as candidates for substitution so that a time for retrieving the words can be reduced.

The present invention provides a machine interpreter comprising a parallel translation data base for registering an example sentence described in a first language and a translated sentence of the example sentence described in a second language to correspond to each other, a variable semantic feature dictionary input means for inputting a request for retrieval of the parallel translation data base, an instruction to substitute a word and the like, retrieving means for retrieving the parallel translation data base by the request for retrieval from the input means, display means for displaying an example sentence and a translated sentence of the parallel translation data base, control means for sorting a variable word group in the vaiable semantic feature dictionalry corresponding to the particular word of the example sentence based on the sort item of each variable semantic feature, and causing the display means to hierarchically display the sort item and a word group belongin to the sort item; and substituting means for sustituting a translated word equivalent to a desired word selected by the input means for the particular word of the example sentence.

BRIEF DESCRIPTION OF THE DRAWINGS

FIGS. 12 (*a*) to 12 (*e*) are diagrams showing a display example (2) of the screen according to the embodiment of the present invention;

FIGS. 14 (*a*) to 14 (*e*) are diagrams showing a display example (4) of the screen according to the embodiment of the present invention;

FIGS. 16 (*a*) to 16 (*e*) are diagrams showing a display example (6) of the screen according to the embodiment of the present invention.

DESCRIPTION OF PREFERRED EMBODIMENTS

Figure 1:
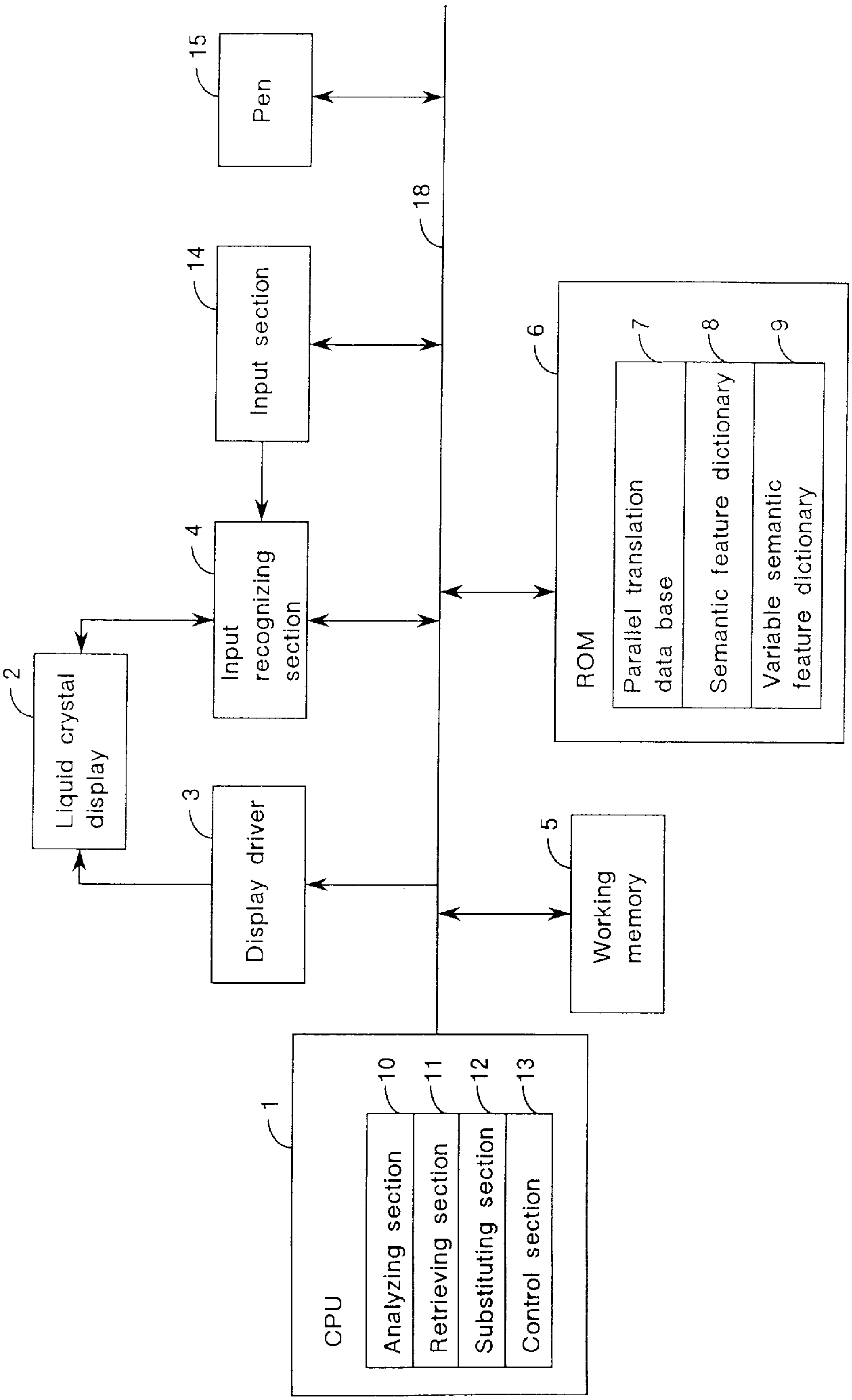
FIG. 1 is a block diagram showing the functional structure of a machine interpreter according to an embodiment of the present invention.

According to a first aspect of the present invention, there is provided a machine interpreter including a parallel translation data base for registering an example sentence described in a first language and a translated sentence of the example sentence described in a second language to correspond to each other. It further includes a variable semantic feature dictionary for causing a variable word group to correspond to a particular word of the example sentence for each semantic feature, and for storing the first and second languages in An input device is used for inputting a request for retrieval of the parallel translation data base, an instruction to substitute a word and the like. A retrieving device is used for retrieving the parallel translation data base by the request for retrieval from the input device. A display is used for displaying an example sentence and a translated sentence of the parallel translation data base. A controller is used for sorting a variable word group in the variable semantic feature dictionalry corresponding to the particular word of the example sentence based on the sort item of each variable semantic feature, and for causing the display to hierarchically display the sort item and a word group belonging to the sort item. Finally, a substituting device is used for substituting a translated word equivalent to a desired word, selected by the input device for the particular word of the example sentence.

The parallel translation data base and the variable semantic feature dictionary may be composed of a ROM of a microcomputer. The input device may include a keyboard, a mouse, a pen tablet, a voice inputting device and the like. The retrieving device, the substituting device and the controller may be composed of a CPU of the microcomputer. The display may include a liquid crystal display, a CRT display, a plasma display and the like.

According to a first aspect of the present invention, the word having the variable semantic feature may be sorted based on a sortable element of the semantic feature (i.e. category), and the sortable element and the word group belonging to the sortable element or category may be hierarchically displayed when the word having the variable semantic feature is substituted in the translated sentence. Consequently, it is possible to greatly reduce labor and time to search for a word to be substituted.

According to a second aspect of the present invention, it is preferable that the controller should sort the variable word group in the variable semantic feature dictionary corresponding to the particular word of the example sentence based on the sortable element of the variable semantic feature, and should cause the display to display the variable word group in reading order.

According to the above-mentioned structure, the word group of the variable semantic feature dictionary may be displayed in an order of 50 sounds or alphabetical (JIS code), for example. Consequently, it is easy to search for a word to be substituted.

According to the third aspect of the present invention, it is preferable that the controller should sort the variable word group in the variable semantic feature dictionary corresponding to the particular word of the example sentence based on the sortable element of the variable semantic feature. Further, the controller preferably causes the display to display the variable word group by setting, to a head, a word identical to the particular word of the example sentence which is being displayed.

According to the above-mentioned structure, the word group of the variable semantic feature dictionary may be displayed by setting, to the head, the word identical to the particular word of the example sentence. Consequently, it is easy to search for a word to be substituted.

According to a fourth aspect of the present invention, it is preferable that the controller further has a function of causing the display to display a column for inputting a character string to be substituted for the particular word of the example sentence, and the substituting device further has a function of substituting a character string for the particular word of the example sentence when the character string is inputted to the column by the input device.

According to the above-mentioned structure, the character string to be substituted can be inserted freely. Consequently, it is possible to obtain communication by effectively utilizing prepared example sentences.

A preferred embodiment of the present invention will be described below in detail with reference to the drawings. While Japanese is used as a first language and English is used as a second language in the following description, it is apparent that any language can be used.

In accordance with the machine interpreter of the present invention, it has the function of substituting elements of a variant part by a user after a desired example sentence is displayed in a machine interpreter having the variant part. Accordingly, a mechanism used before example sentences are displayed is not restricted. Examples of a mechanism for displaying example sentences includes a method for sorting example sentences into scenes to be used, and following each scene. It further includes a method for freely inputting a sentence and displaying a sentence having a close meaning. The latter method will be described below in detail.

Figure 2:
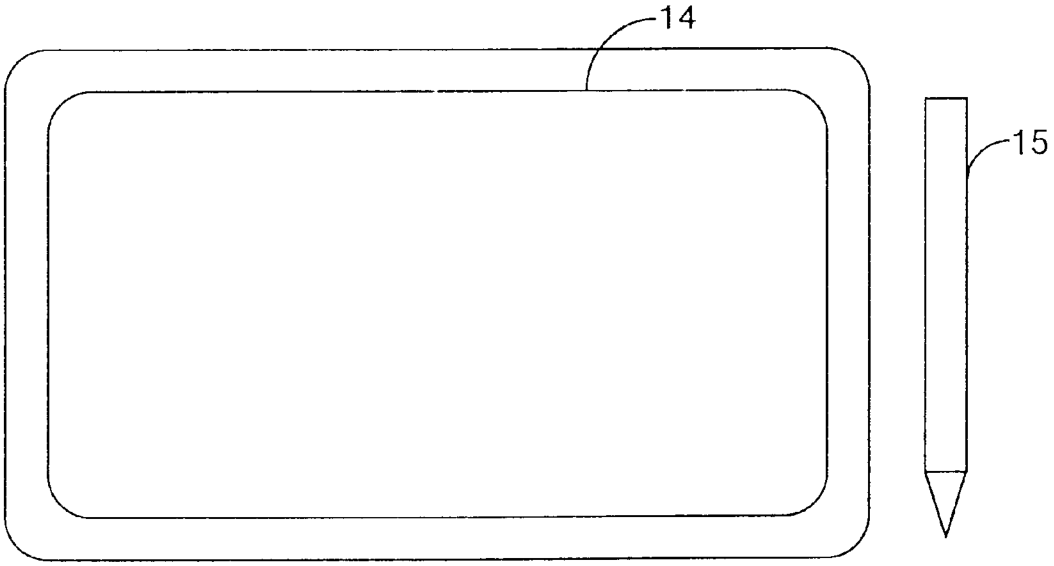
FIG. 2 is a view showing the appearance of the machine interpreter according to the embodiment of the present invention.

FIG. 2 shows the appearance of a machine interpreter according to an embodiment of the present invention. The machine interpreter is convenient for oversea tours, and stores a lot of Japanese and English example sentences in pairs. The Japanese and English example sentences can be displayed on a liquid crystal display 2. The machine interpreter uses hand-written character recognition by a dedicated pen 15 as an interface according to an example. A CRT can also be used as the display, and other devices such as voice or keyboard input can also be used as input section 14.

FIG. 1 is a block diagram showing the functional structure of the machine interpreter according to the embodiment of the present invention. The machine interpreter is provided with a CPU (central processing unit) 1 for fulfilling the central function of various controls. The CPU 1 is connected to a ROM 6, a working memory 5, a display driver 3 and an input recognizing section 4 through a bus 18 such as a data bus, respectively.

The ROM 6 is a bulk memory for storing a program to perform various controls of the machine interpreter, a lot of phrases and the like. The working memory 5 serves to temporarily store data necessary for the execution of the program.

The display driver 3 operates when parallel translated sentences are displayed on the liquid crystal display 2. The input recognizing section 4 serves to recognize data input from a hand-written input board 16 (input section 14) shown in FIGS. 4 (*a*) to 4 (*f*) by means of the dedicated pen 15. A parallel translation data base 7, a semantic feature dictionary 8 and a variable semantic feature dictionary 9 are stored as data in the ROM 6.

The CPU 1 is divided into an analyzing section 10, a retrieving section 11, a substituting section 12 and a control section 13 depending on the properties of operation. The analyzing section 10 serves to analyze the input data recognized by the input recognizing section 4. The retrieving section 11 serves to retrieve the parallel translation data base 7, the semantic feature dictionary 8, and the variable semantic feature dictionary 9 which are stored in the ROM 6. The substituting section 12 serves to substitute variable semantic feature elements. The control section 13 serves to perform controls other than the foregoing, for example, the control of screen display.

An example of the data structure of the parallel translation data base 7, the semantic feature dictionary 8, and the variable semantic feature dictionary 9 will be described below. A lot of useful example sentences to be translated and told to the natives during oversea tours are defined in the following form in the parallel translation data base 7.

EXAMPLE 1

<{ニューヨーク} マデイクラデスカ。> (in Kana)

"How much does it cost to go to {New York}?"

How much does it cost to go to {place name}?

EXAMPLE 2

<{ニューヨーク} カラ {シカゴ} マデイクラデスカ。> (in Kana)

"How much does it cost to go to {Chicago} $2$ from {New York} $1$?"

How much does it cost to go to {place name} from {place name}?

In the example, a first line indicates a Japanese sentence to be displayed, a second line indicates a translated sentence, that is, an English sentence to be displayed together with the Japanese sentence as a result of translation, and a third line indicates a set of semantic features corresponding to the parallel translated sentence, which will be referred to as a semantic feature string. A portion enclosed by { } indicates a variable semantic feature. A portion enclosed by < > indicates a Japanese sentence but it is discribed in English. A portion enclosed " " indicates an Engish sentence.

The semantic features are character strings which act as key words when retrieving the example sentence, and are often assigned one by one to each clause of each Japanese sentence. <How much does it cost to go to New York?> of Example 1 has semantic features of <New York >, <to go to>, <How much> and <does it cost>. To be exact, these are names of the semantic features. The definition of character strings for these semantic features is described in the semantic feature dictionary 8.

<New York> of Example 1 is the variable semantic feature. If various place names such as <London>, <Oxford> and the like can be inserted in this portion of Example 1, sentences which can be translated are doubled very effectively. A Japanese character string and English equivalent thereto which can be inserted in this portion are defined in the variable semantic feature dictionary 9. Their set is dealt with as a variable semantic feature of a {place name}.

In the parallel translation data base 7, the name of the variable semantic feature enclosed by { } is described in a semantic feature string portion, and one of their elements is written in { } of a Japanese sentence on a first line. A translated word is written in { } of an English sentence on a second line. Words in { } of the Japanese and English sentences are defined as parallel translated words in the variable semantic feature dictionary 9. Furthermore, these words serve as representatives of the variable semantic features in the example sentence. In other words, if character strings corresponding to the variable semantic features are not input, these elements are displayed.

For example, Example 1 has a variable semantic feature having the name of {place name}. In this sentence, the representative of the variable semantic feature and English equivalent thereto are <New York>. In case where one sentence has a plurality of variable semantic features, the order of appearance of the variable semantic features in a Japanese sentence is coincident with the order of appearance of the variable semantic features of the semantic feature string.

Similarly, Example 2 has two variable semantic features having the name of {place name}. In this sentence, the representative of a first {place name} variable semantic feature and English equivalent thereto are <New York> and "New York", respectively, and the representative of a second "place name" variable semantic feature and English equivalent thereto are <Chicago> and "Chicago", respectively. In Example 2, $1$ and $2$ described behind { } indicate that respective {place name} variable semantic features correspond to first and second variable semantic features of the Japanese sentence.

More specifically, the first {place name} variable semantic feature having <New York> corresponds to {New York}$1$ and the second {place name} variable semantic feature having <Chicago> corresponds to {Chicago}$2$. A semantic feature which is not variable is referred to as an invariable semantic feature when distinguished from the variable semantic feature.

Names of the semantic features and Japanese character strings to be extracted as the semantic features are defined in the semantic feature dictionary 8. For example, the semantic features of <from>, <to go to>, <How much> and <does it cost> are defined in the semantic feature dictionary 8 as follows.

| | |
|---|---|
| < from > | "from" |
| < to go to > | "to" |
| < How much > | "How much" |
| < does it cost > | " does it cost " |

This means that Japanese character strings on the left side are defined as semantic features of names on the right side. For example, a character string of <How much> is defined as a semantic feature having the name of "How much".

Names of the variable semantic features, Japanese character strings which act as elements included in the names, and English equivalent thereto are defined in the variable semantic feature dictionary 9. For example, a set of the elements of the variable semantic features of the {place name} and English equivalent thereto is defined in the variable semantic feature dictionary 9 as follows.

| Place name | |
|---|---|
| a Japanese sentence | an English sentence |
| < New York > | " New York " |
| < Chicago > | " Chicago " |
| < London > | " London " |
| < Oxford > | " Oxford " |

This means that each Japanese character string; <New York> and the like) on the left side on and after a second line is defined as an element of a variable semantic feature of the {place name} and English equivalent thereto is defined as an English character string ("New York" and the like) on the right side of the same character string.

The actual operation of the machine interpreter will be described below. The summary of the basic operation of the machine interpreter is as follows. A user inputs a sentence to be translated, detects a semantic feature from the sentence, detects a fixed type sentence from the semantic feature, and substitutes and displays a variable semantic feature in the fixed type sentence.

In the following, a sentence to be translated which is input by the user will be referred to as an input sentence, and a Japanese sentence stored in the machine interpreter will be referred to as a fixed type sentence. A pair of the fixed type sentence and an English sentence equivalent thereto will be referred to as parallel translated sentences.

Figure 3:
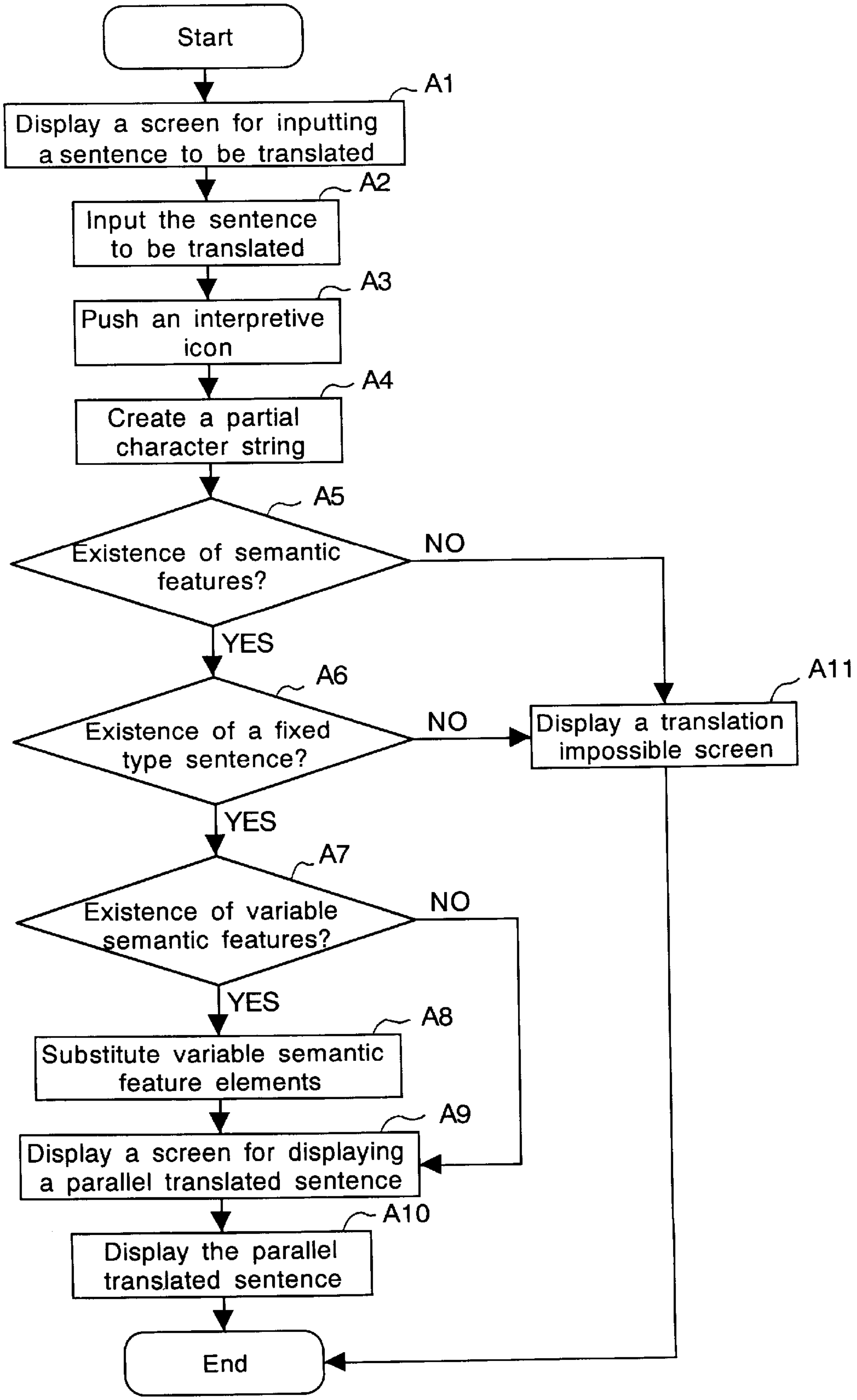
FIG. 3 is a flowchart showing procedure of a processing (1) according to the embodiment of the present invention.

The operation of the machine interpreter will be described below with reference to a flowchart shown in FIG. 3. Each step of the flowchart shown in FIG. 3 will be described below in detail. As an example, the process for translating <How much does it cost to go to London?> will be described below (hereinafter, this sentence will be referred to as an input sentence 1).

Step A1: The control section 13 of the CPU 1 causes "a screen for inputting a sentence to be translated" shown in FIG. 4 (*a*) to be displayed on the liquid crystal display 2 through the display driver 3.

Figure 4:
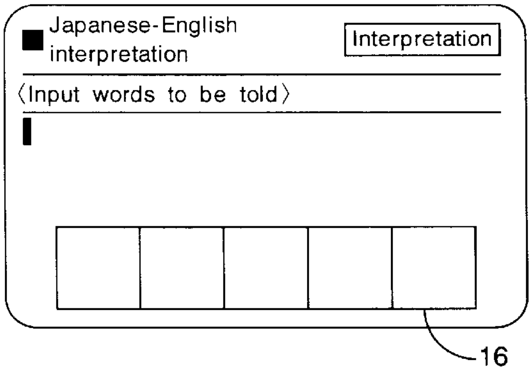
FIGS. 4 (*a*) to 4 (*f*) are diagrams showing a display example (1) of a screen according to the embodiment of the present invention.
Figure 4:
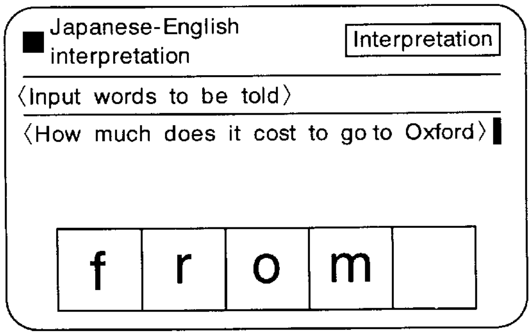
Figure 4:
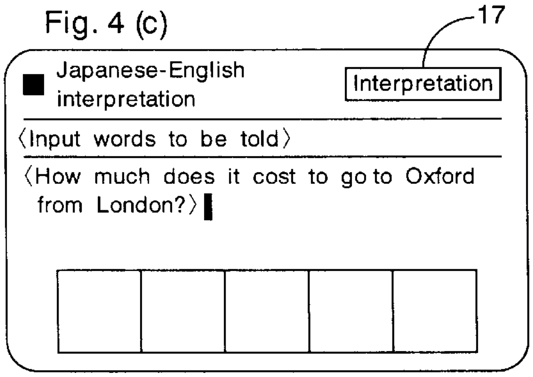
Figure 4:
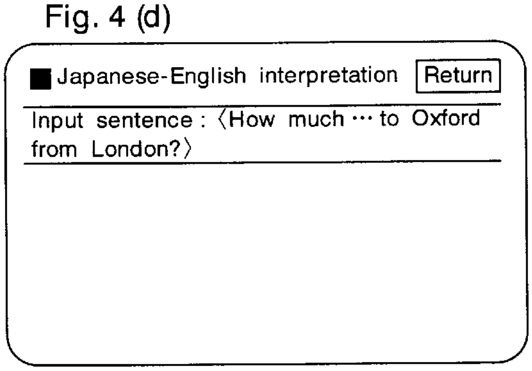
Figure 4:
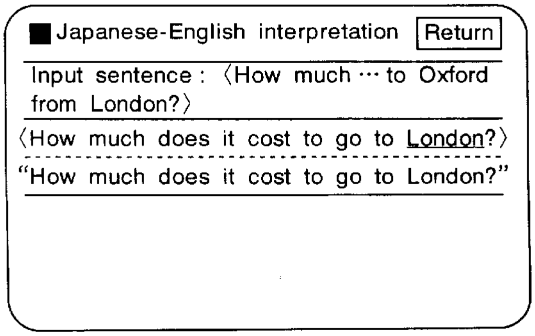
Figure 4:
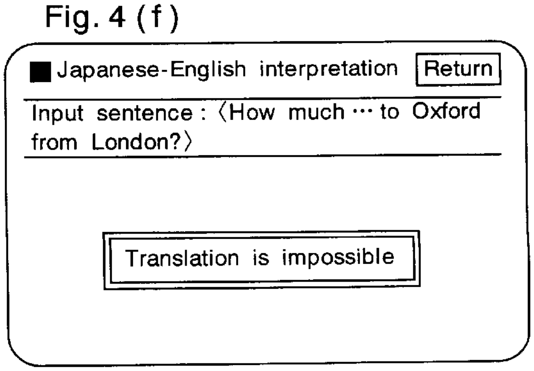

Step A2: A user inputs <How much does it cost to go to London?> to a handwriting input board 16 by handwriting by means of the dedicated pen 15 on the screen for inputting a sentence to be translated shown in FIG. 4 (*a*). FIG. 4 (*b*) shows the state of the middle of input. FIG. 4 (*c*) shows the state in which the input is terminated.

Step A3: The user pushes an interpretive icon 17 shown in FIG. 4 (*c*). The input sentence is recognized by the input recognizing section 4 and is temporarily stored in the working memory 5. Then, the routine proceeds to Step A4.

Step A4: The analyzing section 10 of the CPU 1 creates a partial character string from the input sentence 1 stored in the working memory 5 at Step A3. The created partial character string is stored in the working memory 5. Then, the routine proceeds to Step A5. The partial character string of the input sentence 1 is as follows.

< How... >
< How much ... >
.
.
.
< How much ... to ... >
< How much ... to London >
.
.

These are stored in the working memory 5.

Step A5: The retrieving section 11 of the CPU 1 retrieves the semantic feature dictionary 8 and the variable semantic feature dictionary 9 stored in the ROM 6 by using, as a key, the partial character string of the input sentence 1 stored in the working memory 5 at Step A4. If the semantic feature dictionary 8 has a partial character string defined as a semantic feature, the retrieving section 11 of the CPU 1 causes the character string and the name of the semantic feature to be stored in pairs in the working memory 5. Then, the routine proceeds to Step A6. If not, the routine proceeds to Step A11. At this time, the partial character string is retrieved from the head in order. The order is retained so that the order of appearance of each semantic feature in the input sentence 1 is also retained.

The process for retrieving the semantic feature dictionary 8 and the variable semantic feature dictionary 9 by using, as a key, a partial character string <How much> of the input sentence 1 will be described below.

The retrieving section 11 of the CPU 1 reads, one by one in order, the contents of the semantic feature dictionary 8 stored in the ROM 6, and causes the same contents to be stored in the working memory 5. On each line, the name of each semantic feature is described on the left side and a character string defined as the semantic feature is described on the right side. It is assumed that the semantic feature dictionary 8 has the following line.

<How much> "How much"

Since the character string <How much> is defined in the semantic feature dictionary 8, the retrieving section 11 of the CPU 1 causes the name of the semantic feature on the right side, that is, "How much", and the partial character string of the input sentence 1, that is <How much>, to be restored in pairs in the working memory 5.

In the semantic feature dictionary 8, the character string <How much> is not defined in other portions. Therefore, the retrieval of the semantic feature dictionary 8 is completed.

Next, the retrieving section 11 of the CPU 1 retrieves the variable semantic feature dictionary 9 by using <How much> as a key. The character string <How much> does not appear in the variable semantic feature dictionary 9. Consequently, the retrieval using <How much> as the key is completed. The next partial character string is set to the key.

The process for retrieving the semantic feature dictionary 8 and the variable semantic feature dictionary 9 by using <London> as the key will be described below. It is assumed that a character string <London> is stored in the working memory 5.

The retrieving section 11 of the CPU 1 examines whether or not the character string <London> is defined in the semantic feature dictionary 8 stored in the ROM 6. The character string <London> does not appear in the semantic feature dictionary 8. Therefore, the variable semantic feature dictionary 9 is then retrieved. It is assumed that the variable semantic feature dictionary 9 has the following description.

| Place name | |
|---|---|
| a Japanese sentence | an English sentence |
| < New York > | " New York " |
| < Chicago > | " Chicago " |
| < London > | " London " |
| < Oxford > | " Oxford " |

Since the character string <London> is defined in the variable semantic feature dictionary 9, the retrieving section 11 of the CPU 1 causes the name of the variable semantic feature including the character string <London>, that is, the {place name}, and the English equivalent to the element, that is, "London" to be stored in the working memory 5.

In the variable semantic feature dictionary 9, the character string <London> is not defined in other portions. Therefore, the retrieval of the variable semantic feature dictionary 9 is completed. The above-mentioned working is performed on all the partial character strings of the input sentence 1.

It is assumed that the following variable/invariable semantic features are detected from the input sentence 1.

<London>="place name": Variable semantic feature

<to go to>="to go to": Invariable semantic feature

<How much>="How much": Invariable semantic feature

<does it cost>="does it cost": Invariable semantic feature

The right side of "=" indicates the name of the semantic feature. The character string on the left side is detected as variable/invariable semantic features of the name on the right side. English equivalent to the variable semantic feature element <London> is also stored as "London".

<London>="London"

The right side of "=" indicates English equivalent to the element of the variable semantic feature. A word on the right side is detected as an English equivalent to a word on the left side. It is assumed that each semantic feature detected from the input sentence is detected in vertical order on the above correspondence table. This order is retained in the working memory 5. In this example, the semantic feature is retrieved. Then, the routine proceeds to Step A6.

Step A6: The retrieving section 11 of the CPU 1 retrieves the parallel translation data base 7 stored in the ROM 6 by using, as a key, the names of the variable/invariable semantic features stored in the working memory 5 at Step A5. If some of the variable/invariable semantic feature names appear on the parallel translation data base 7, fixed type sentences thereof are stored in the working memory 5 together with English sentences equivalent to the fixed type sentences and the semantic feature string. Then, the routine proceeds to Step A7. If not, the routine proceeds to Step A11.

By taking the input sentence 1 as an example, Step A6 will be described below in detail. First of all, the CPU 1 retrieves the parallel translation data base 7 by using, as a key, one of the semantic features stored in the working memory 5 at Step A5.

The parallel translation data base 7 is retrieved by using a semantic feature "place name" as a key. It is assumed that the parallel translation data base 7 has the following description.

EXAMPLE 1

<How much does it cost to go to {New York}?> (a Japanese sentece)

"How much does it cost to go to {New York}?"

How much does it cost to go to {place name}?

The semantic feature string includes a {place name} semantic feature. Accordingly, the retrieving section 11 of the CPU 1 causes Example 1 to be stored in the working memory 5.

In the parallel translation data base 7, the {place name} semantic feature is not included in other portions. Consequently, retrieval using the {place name} as the key is completed. The retrieving section 11 of the CPU 1 performs the above-mentioned working on all semantic features stored in the working memory 5. It is assumed that retrieval for all the semantic features is completed and Example 1 is stored in the working memory 5 as the fixed type sentence which has been retrieved. In this example, the fixed type sentence is retrieved. Then, the routine proceeds to Step A7.

Step A7: The analyzing section 10 of the CPU 1 decides whether or not the fixed type sentence stored in the working memory 5 at Step A6 has the variable semantic feature. If so, the routine proceeds to Step A8. If not, the routine proceeds to Step A9. Example 1 has the variable semantic feature {place name}. Consequently, the routine proceeds to Step A8.

Step A8: The substituting section 12 of the CPU 1 substitutes variable semantic feature elements of a Japanese fixed type sentence stored in the working memory 5 for the variable semantic feature elements in the input sentence 1. Furthermore, the substituting section 12 of the CPU 1 substitutes variable semantic feature elements of an English sentence for English equivalent to the element stored in the working memory 5. A parallel translated sentence is stored in the form of substitution in the working memory 5. Then, the routine proceeds to Step A9.

Now, an element <New York> is inserted in the "place name" variable semantic feature in Example 1. The "place name" variable semantic feature element detected from the input sentence 1 is <London>. At the same time, English equivalent to <London> is also stored in the working memory 5. Accordingly, the substituting section 12 of the CPU 1 substitutes <New York> in Example 1 for <London> as follows.

EXAMPLE 1

<How much does it cost to go to {London}?> (a Japanese sentence)

"How much does it cost to go to {London}?"

How much does it cost to go to {place name}?

This form is stored in the working memory 5. Then, the routine proceeds to Step A9.

Step A9: The control section 13 of the CPU 1 changes the liquid crystal display 2 from a free sentence interpretive input screen shown in FIG. 4 (*c*) to a parallel translated sentence display screen shown in FIG. 4 (*d*) through the display driver 3. Then, the routine proceeds to step A10.

Step A10: The control section 13 of the CPU 1 causes Japanese and English sentences of Example 1 stored in the working memory 5 to be displayed in the form of parallel translation shown in FIG. 4 (*e*) on the liquid crystal display 2 through the display driver 3. At this time, the variable semantic feature is underlined for display. As described above, the machine interpreter operates by taking the input sentence 1 as an example.

Steps of the flowchart shown in FIG. 3 which have not been followed will be described below. In the case where the semantic feature or fixed sentence is not retrieved at Step A5 or A6, the effect that translation cannot be performed is displayed. This processing is performed at Step A11.

Step A11: The control section 13 of the CPU 1 changes the liquid crystal display 2 from the free sentence interpretive input screen shown in FIG. 4 (*c*) to a translation impossible screen shown in FIG. 4 (*f*) through the display driver 3.

The process for substituting the variable semantic feature in the displayed parallel translated sentence will be described below. The process in which the user substitutes the variable semantic feature elements will be described below with reference to a flowchart shown in FIG. 5.

<London> of <How much does it cost to go to London?> is an element of the {place name} variable semantic feature. As an example, the case where <London> is substituted for <New York> which is an element of the {place name} variable semantic feature will be described below.

Step B1: The user specifies the variable semantic feature which should be substituted in the displayed example sentence. The variable semantic feature is underlined as shown in FIG. 12 (*a*). When the user touches the variable semantic feature by means of the pen 15, the control section 13 of the CPU 1 deduces the name of the variable semantic feature from the position of the variable semantic feature through the input recognizing section 4, and causes the same name to be stored in the working memory 5. The moment the user touches the variable semantic feature, the control section 13 of the CPU 1 inverts the variable semantic feature of the liquid crystal display 2 through the display driver 3.

It is assumed that the user touches <London> shown in FIG. 12 (*a*) by means of the pen 15. As shown in FIG. 12 (*b*), a portion of <London> is inverted and the name of the variable semantic feature to which <London> belongs, that is, the {place name} is stored in the working memory 5.

Step B2: The retrieving section 11 of the CPU 1 retrieves the variable semantic feature dictionary 9 by using, as a key, the name of the variable semantic feature stored at Step B1, and causes all elements of the variable semantic feature to be stored in the form of parallel translation in the working memory 5.

The variable semantic feature dictionary 9 is retrieved by using the {place name} as a key. The {place name} variable semantic feature is defined in the variable semantic feature dictionary 9 as follows.

| | |
|---|---|
| Place name | |
| a Japanese sentence | an English sentence |
| < Oxford > | “ Oxford ” |
| < London > | “ London ” |
| < New York > | “ New York ” |
| < Chicago > | “ Chicago ” |
| < San Francisco > | “ San Francisco ” |
| < Los Angeles > | “ Los Angeles ” |
| < Atlanta > | “ Atlanta ” |
| < Honolulu > | “ Honolulu ” |
| < Vancouver > | “ Vancouver ” |
| < Victoria > | “ Victoria ” |
| < Toronto > | “ Toronto ” |
| < Ottawa > | “ Ottawa ” |

This structure is stored in the working memory 5 as it is.

Step B3: The control section 13 of the CPU 1 causes Japanese elements of the variable semantic feature stored at Step B2 to be displayed on the liquid crystal display 2 through the display driver 3 as shown in FIG. 12 (*c*). In the case where the number of the variable semantic feature elements is great, a scroll key is attached as shown in FIG. 12 (*c*).

Step B4: The user selects one of the elements of the displayed variable semantic feature. When the user touches the element by means of the pen 15, the analyzing section 10 of the CPU 1 causes the element to be stored in the working memory 5. The moment the user touches the element, the control section 13 of the CPU 1 inverts the element of the liquid crystal display 2 through the display driver 3. It is assumed that the user touches a portion of <New York> shown in FIG. 12 (*c*) by means of the pen 15. As shown in FIG. 12 (*d*), the portion of <New York> is inverted.

Step B5: The substituting section 12 of the CPU 1 substitutes the variable semantic feature element in a parallel translated example sentence stored in the working memory 5 for the same element stored at Step B4, and causes the corresponding element to be stored in the working memory 5.

<How much does it cost to go to London?> (a Japanese sentence)

“How much does it cost to go to London?”

The above-mentioned <London> and “London” are substituted for <New York> and “New York”, respectively.

<How much does it cost to go to New York?>

“How much does it cost to go to New York?”

Step B6: The control section 13 of the CPU 1 causes a parallel translated example sentence stored in the working memory 5 to be displayed on the liquid crystal display 2 through the display driver 3 as shown in FIG. 12 (*e*).

Thus, when the variable semantic feature element which is not intended by the user is output, it is possible to substitute the variable semantic feature elements later so as to obtain an example sentence having meaning closer to that of the intended sentence.

A preferred embodiment for each aspect of the present invention will be described below.

According to the first aspect of the present invention, each batch of the variable semantic feature elements is displayed. More specifically, the variable semantic feature elements are displayed for each meaningful batch to which they belong.

First of all, it is necessary to add the description of the variable semantic feature dictionary 9. In order to categorize the variable semantic feature elements, category names are described corresponding to the variable semantic feature elements of the variable semantic feature dictionary 9.

In an example to be described below, a word following the “category” to the right side indicates the category name, and elements provided immediately after the line are included in the same category.

| | |
|---|---|
| Place name | |
| Category : Place name in U.S.A. | |
| a Japanese sentence | an English sentence |
| < New York > | “ New York ” |
| < Chicago > | “ Chicago ” |
| < San Francisco > | “ San Francisco ” |
| < Los Angeles > | “ Los Angeles ” |
| < Atlanta > | “ Atlanta ” |
| < Honolulu > | “ Honolulu ” |
| Category : Place name in England | |
| < London > | “ London ” |
| < Oxford > | “ Oxford ” |
| Category : Place name in Canada | |
| < Vancouver > | “ Vancouver ” |
| < Victoria > | “ Victoria ” |
| < Toronto > | “ Toronto ” |
| < Ottawa > | “ Ottawa ” |

A method for giving the category name is not restricted to the foregoing. For example, it is also possible to cause the category to correspond to the name of the variable semantic feature.

The operation will be described below with reference to the flowchart.

Figure 6:
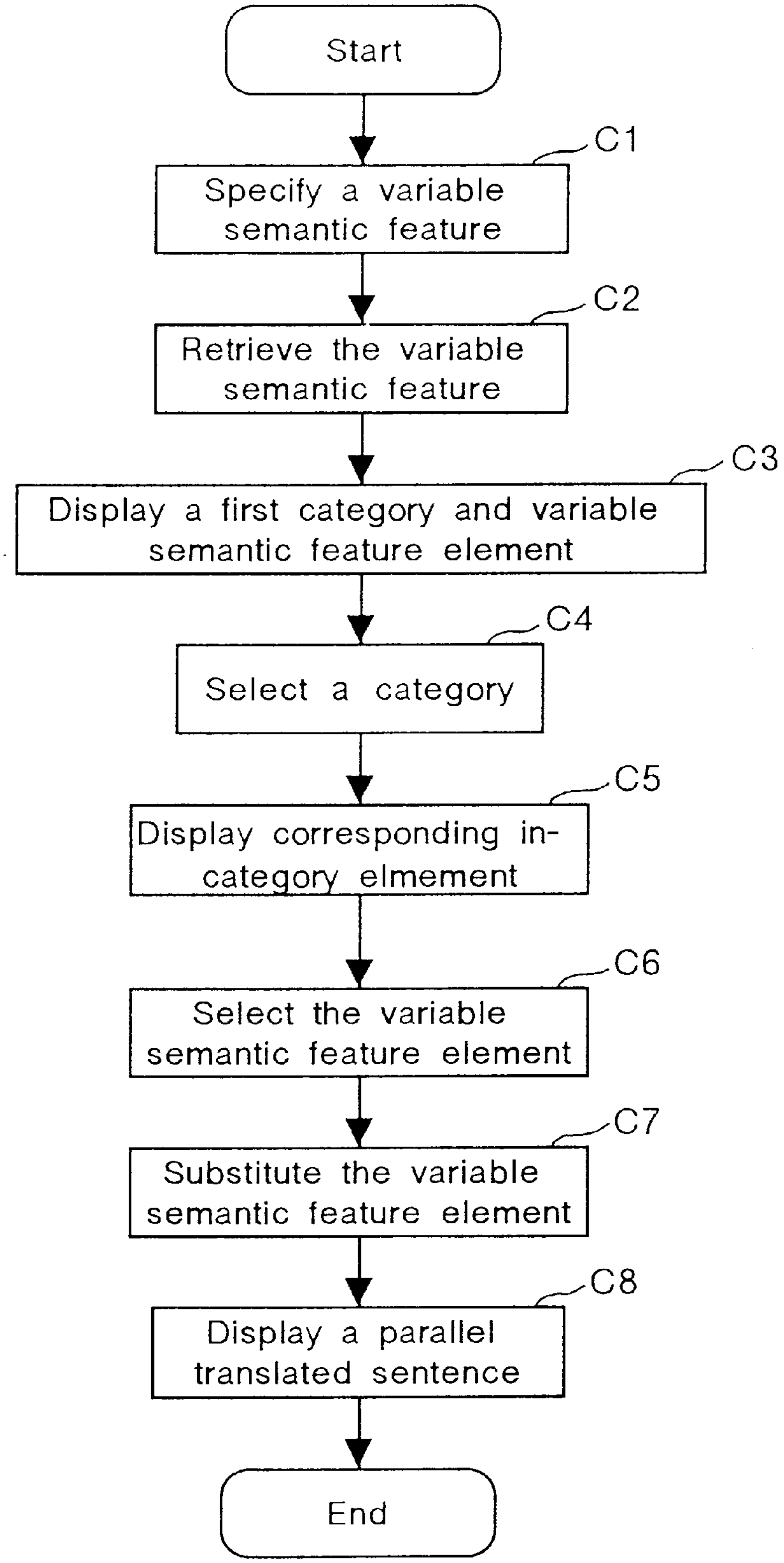
FIG. 6 is a flowchart showing procedure of a processing (3) according to the embodiment of the present invention.

The process for translating the input sentence is the same as in the above-mentioned example. Accordingly, the process in which the user substitutes the variable semantic feature elements will be described below with reference to a flowchart shown in FIG. 6.

It is assumed that the user inputs <How much does it cost to go to London?> and a sentence <How much does it cost to go to London?> is retrieved and displayed. The case where <London> of this sentence is substituted for <New York> which is an element of the {place name} variable semantic feature will be described below as an example.

Figure 13:
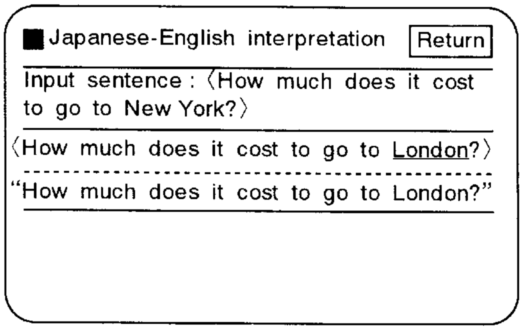
FIGS. 13 (*a*) to 13 (*f*) are diagrams showing a display example (3) of the screen according to the embodiment of the present invention.
Figure 13:
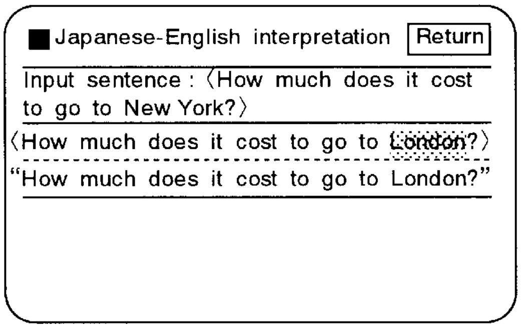
Figure 13:
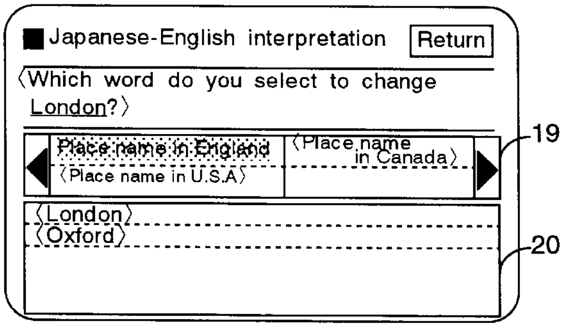
Figure 13:
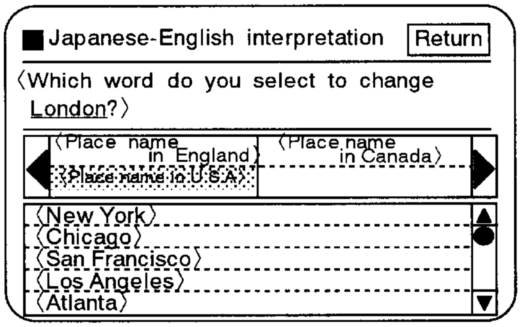
Figure 13:
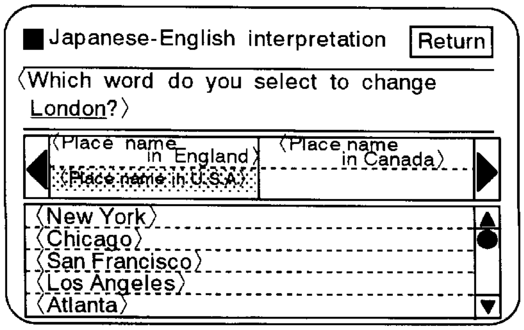
Figure 13:
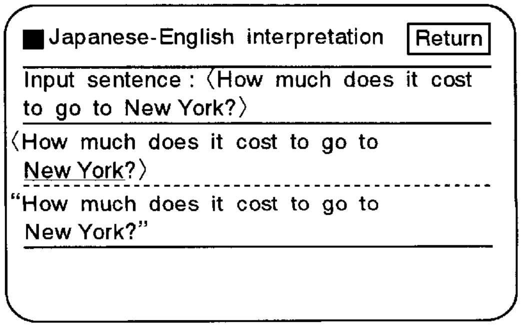

Step C1: The user specifies the variable semantic feature which should be substituted in the displayed example sentence. The variable semantic feature is underlined as shown in FIG. 13 (*a*). When the user touches the variable semantic feature by means of the pen 15, the control section 13 of the CPU 1 deduces the name of the variable semantic feature from the position of the variable semantic feature through the input recognizing section 4, and causes the same name to be stored in the working memory 5. The moment the user touches the variable semantic feature, the control section 13 of the CPU 1 inverts the variable semantic feature of the liquid crystal display 2 through the display driver 3.

It is assumed that the user touches <London> shown in FIG. 13 (*a*) by means of the pen 15. As shown in FIG. 13 (*b*), a portion of <London> is inverted. The name of the variable semantic feature to which <London> belongs, that is, the {place name} is stored in the working memory 5.

Step C2: The retrieving section 11 of the CPU 1 retrieves the variable semantic feature dictionary 9 by using, as a key, the name of the variable semantic feature stored at Step C1, and causes all elements of the variable semantic feature to be stored in the form of parallel translation in the working memory 5.

The variable semantic feature dictionary 9 is retrieved by using the "place name" as the key. The {place name} variable semantic feature is defined in the variable semantic feature dictionary 9 as follows.

| | |
|---|---|
| Place name | |
| Category : Place name in England | |
| a Japanese sentence | an English sentence |
| < Oxford > | " Oxford " |
| < London > | " London " |
| Category : Place name in U.S.A. | |
| < New York > | " New York " |
| < Chicago > | " Chicago " |

This structure is stored in the working memory 5 as it is.

Step C3: The control section 13 of the CPU 1 causes Japanese elements of the variable semantic feature stored at Step C2 to be displayed on the liquid crystal display 2 through the display driver 3 as shown in FIG. 13 (*c*).

In case, a category display board 19 and an in-category element display board 20 are displayed in the upper and lower portions as shown in FIG. 13 (*c*), respectively. The category name is displayed on the category display board 19.

In the initial state, a first category is inverted and brought into the state of selection. An element belonging to the category in the state of selection is displayed on the in-category element display board 20. In the initial state, an element in the first category is displayed.

The category name described at the head of the variable semantic feature dictionary 9, that is, <place name in England> is inverted and brought into the state of selection as shown in FIG. 13 (*c*). The elements <Oxford> and <London> are displayed. In the case where the numbers of the categories and the elements thereof are great, a scroll key is attached as shown in FIG. 13 (*d*).

Step C4: The user selects a desired one of the displayed category names. When the user touches the category name by means of the pen 15, the control section 13 of the CPU 1 causes the category names to be stored in the working memory 5 through the input recognizing section 4. It is assumed that the user touches the category <place name in U.S.A.> shown in FIG. 13 (*c*) by means of the pen 15.

Step C5: The control section 13 of the CPU 1 fetches Japanese elements of the category names stored at Step C4 from the working memory 5, and causes the Japanese elements to be displayed on the in-category element display board 20 in the lower portion of the liquid crystal display 2 through the display driver 3 as shown in FIG. 13 (*d*). As shown in FIG. 13 (*d*), the category <place name in U.S.A.> is inverted and brought into the state of selection. The elements belonging to the category <place name in U.S.A.>, that is, <New York>, <Chicago> and the like are displayed.

Step C6: The user selects one of the contents of the displayed variable semantic feature. When the user touches the corresponding element by means of the pen 15, the analyzing section 10 of the CPU 1 causes the element to be stored in the working memory 5. The moment the user touches the element, the control section 13 of the CPU 1 inverts the corresponding element of the liquid crystal display 2 through the display driver 3. It is assumed that the user touches a portion of <New York> shown in FIG. 13 (*d*) by means of the pen 15. Consequently, the portion of <New York> is inverted as shown in FIG. 13 (*e*).

Step C7: The substituting section 12 of the CPU 1 semantic feature element in the parallel translated example sentence stored in the working memory 5 for the element stored at Step C4, and causes the element to be stored in the working memory 5.

<How much does it cost to go to London?>

"How much does it cost to go to London?"

The above-mentioned <London> and "London" are substituted for <New York> and "New York", respectively.

<How much does it cost to go to New York?>

"How much does it cost to go to New York?"

Step C8: The control section 13 of the CPU 1 causes the parallel translated example sentence stored in the working memory 5 to be displayed on the liquid crystal display 2 through the display driver 3 as shown in FIG. 13 (*f*). By the above-mentioned processing, the variable semantic features could be displayed hierarchically.

According to the second aspect of the present invention, the variable semantic feature elements are displayed in particular order. More specifically, the variable semantic feature elements are displayed in order of 50 sounds and in alphabetical order (that is, in order of JIS code).

Figure 7:
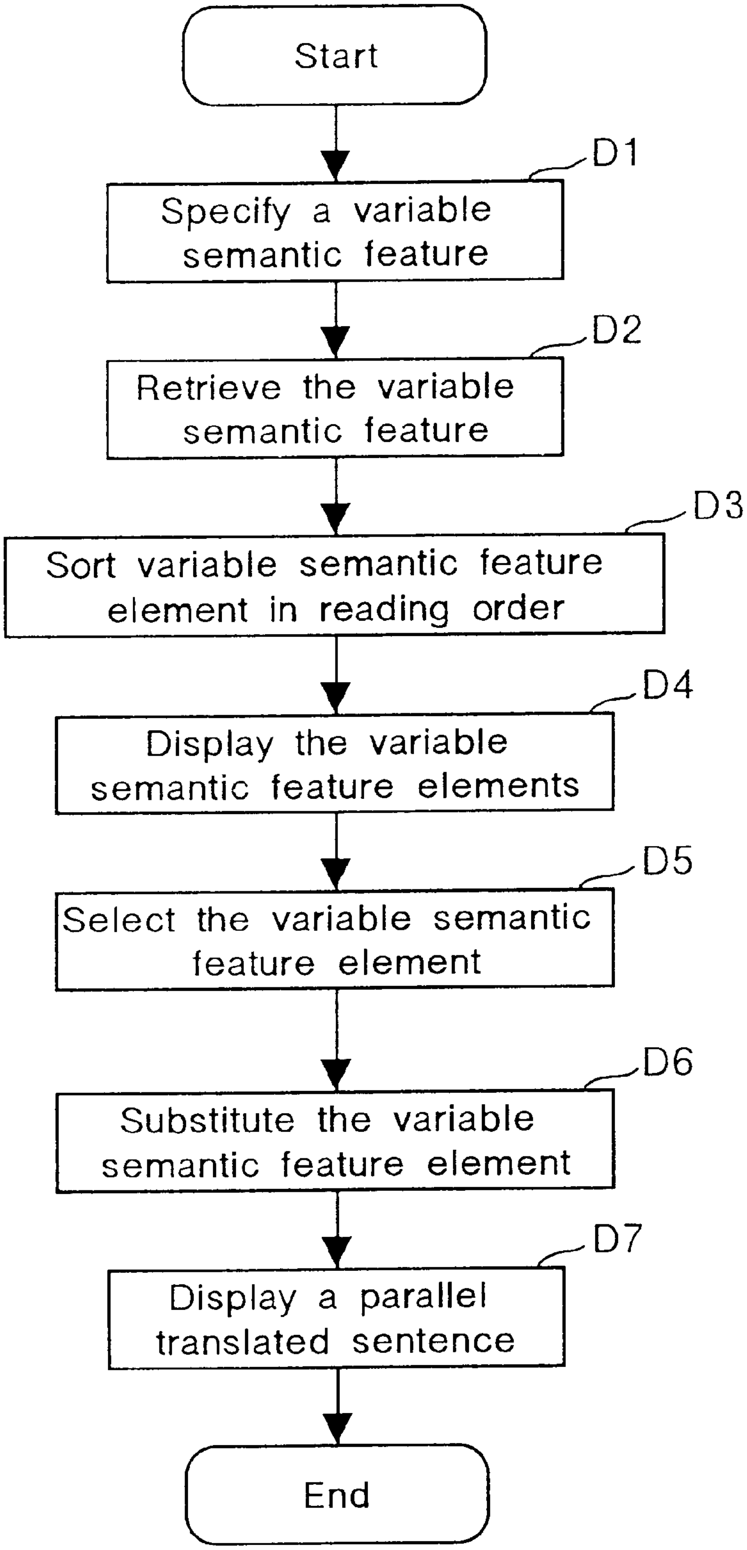
FIG. 7 is a flowchart showing procedure of a processing (4) according to the embodiment of the present invention.

The procedure of the processing is shown in the flowchart of FIG. 7. While this processing is basically the same as the above-mentioned processing, it is different therefrom in that the variable semantic feature elements are sorted in order of 50 sounds of kanas, for example (Step D3). In the case where the variable semantic feature elements are sorted in order of 50 sounds of kanas, the kana is described corresponding to each variable semantic feature element of the variable semantic feature dictionary 9. Furthermore, the kanas are always sorted in order of 50 sounds and are stored in the working memory 5. An example is as follows.

| | |
|---|---|
| Place name | |
| a Japanese sentence | an english sentence |
| < Atlanta > | " Atlanta " |
| < Chicago > | " Chicago " |
| < Honolulu > | " Honolulu " |
| < London > | " London " |
| < Los Angeles > | " Los Angeles " |
| < New York > | " New York " |
| < Ottawa > | " Ottawa " |
| < Oxford > | " Oxford " |
| < San Francisco > | " San Francisco " |
| < Toronto > | " Toronto " |

-continued

| | |
|---|---|
| < Vancouver > | “ Vancouver ” |
| < Victoria > | “ Victoria ” |

Since variable semantic feature elements are arranged and displayed as shown in FIG. 14 (*c*), it is easy to search for a desired word. FIGS. 14 (*a*) to 14 (*e*) show display of a screen in this example.

Figure 8:
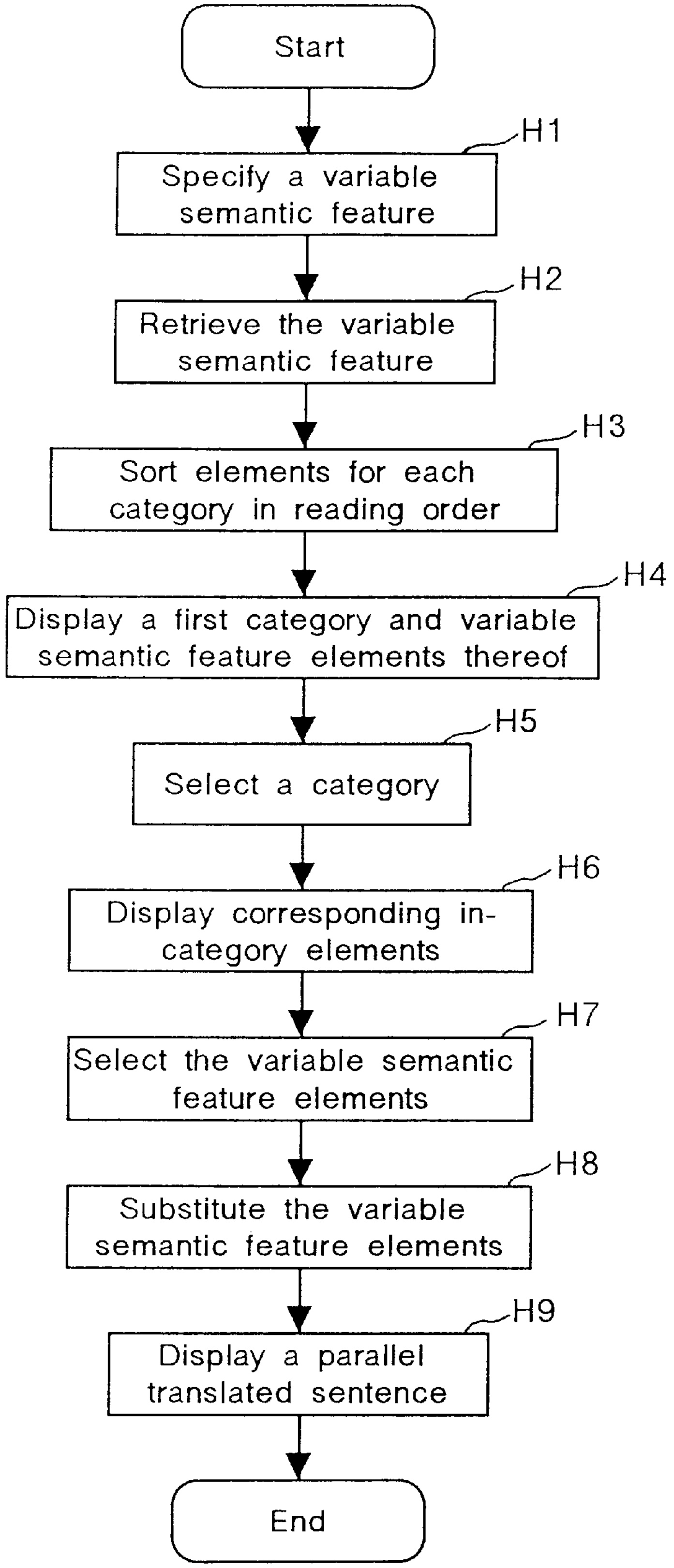
FIG. 8 is a flowchart showing procedure of a processing (5) according to the embodiment of the present invention.
Figure 15:
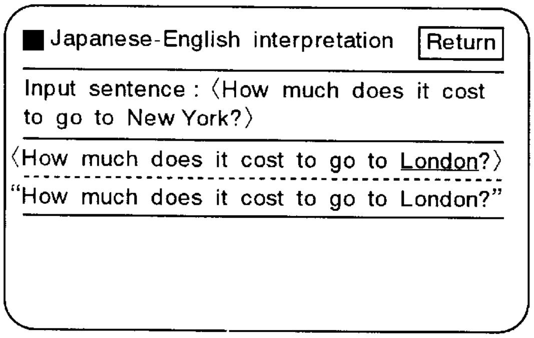
FIGS. 15 (*a*) to 15 (*f*) are diagrams showing a display example (5) of the screen according to the embodiment of the present invention.
Figure 15:
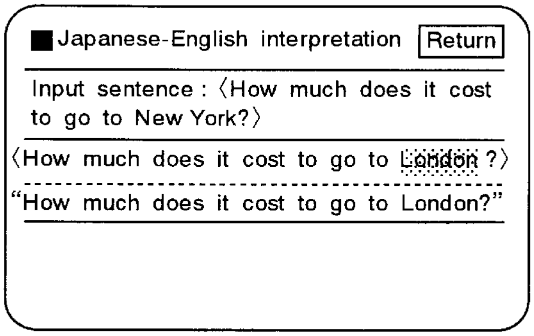
Figure 15:
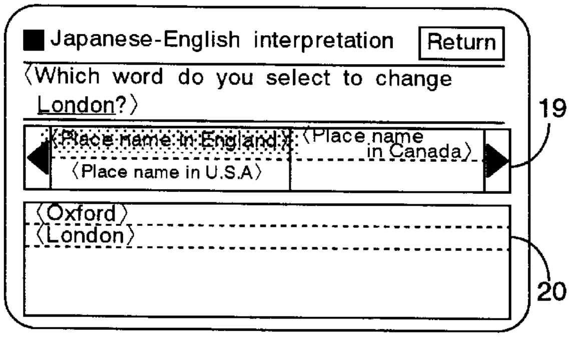
Figure 15:
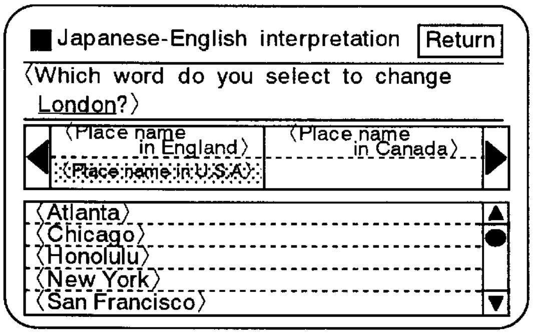
Figure 15:
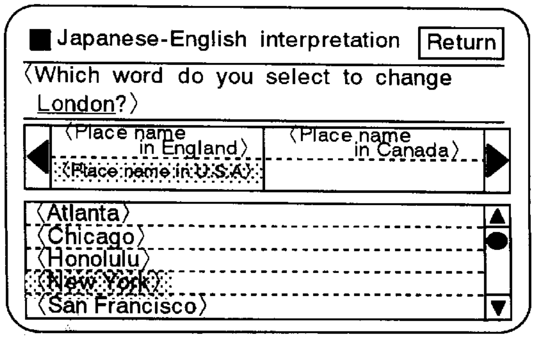
Figure 15:
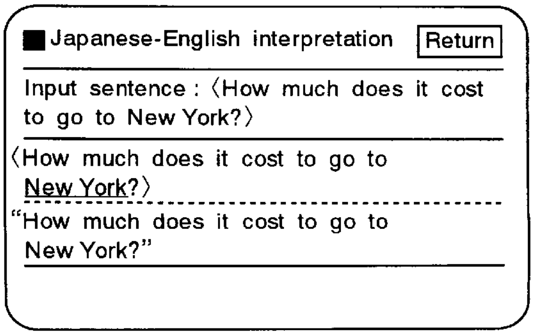

This example can be executed in combination with the hierarchical display described above. In other words, the elements are hierarchically arranged and displayed in reading order. FIG. 8 is a flowchart showing the procedure of the processing. FIGS. 15 (*a*) to 15 (*f*) show display of the screen in this example.

Figure 9:
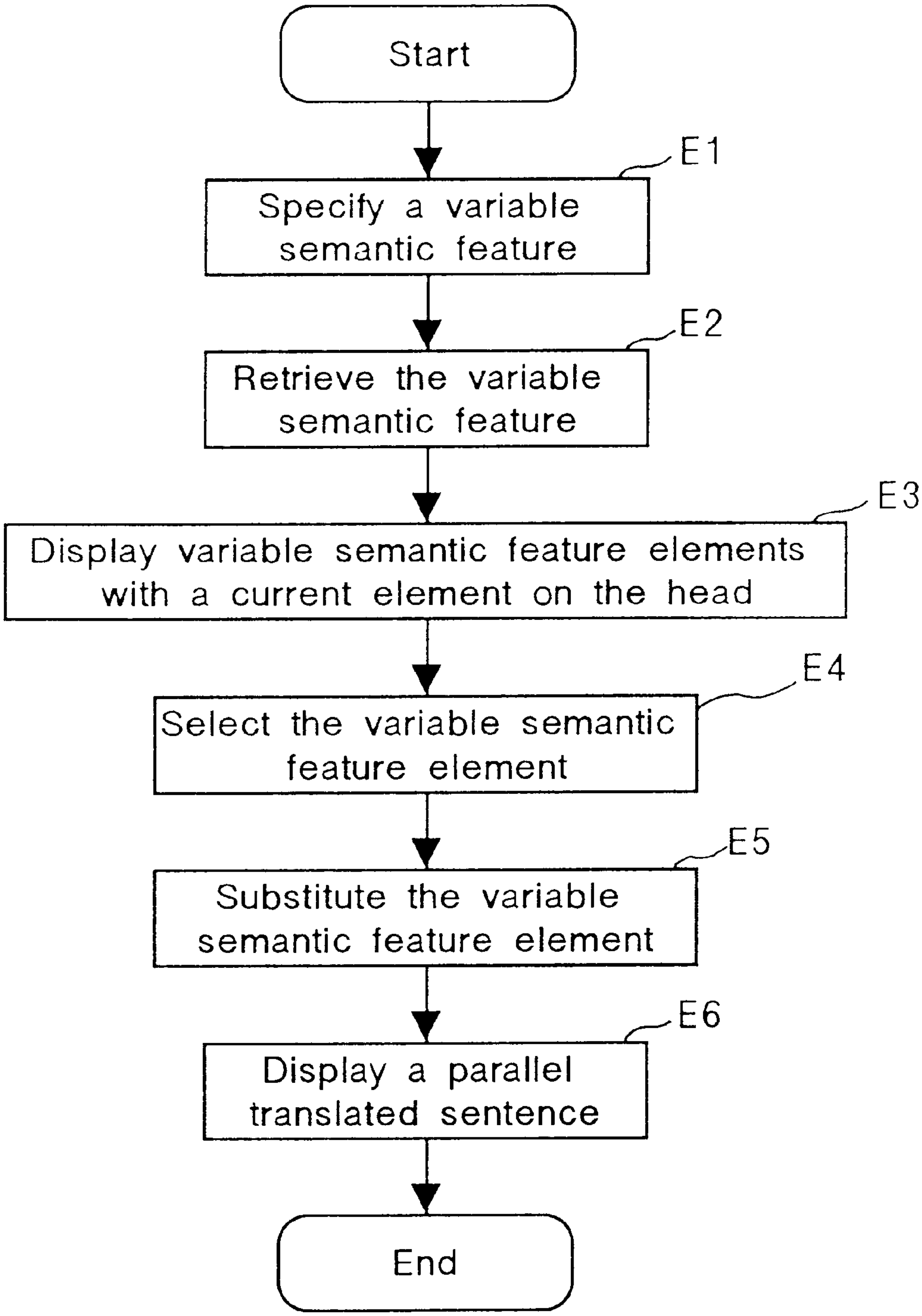
FIG. 9 is a flowchart showing procedure of a processing (6) according to the embodiment of the present invention.

According to the third aspect of the present invention, the first position of a cursor is set to a word which is being used in an example sentence to display the variable semantic feature elements. The procedure of this processing is shown in FIG. 9.

Figure 5:
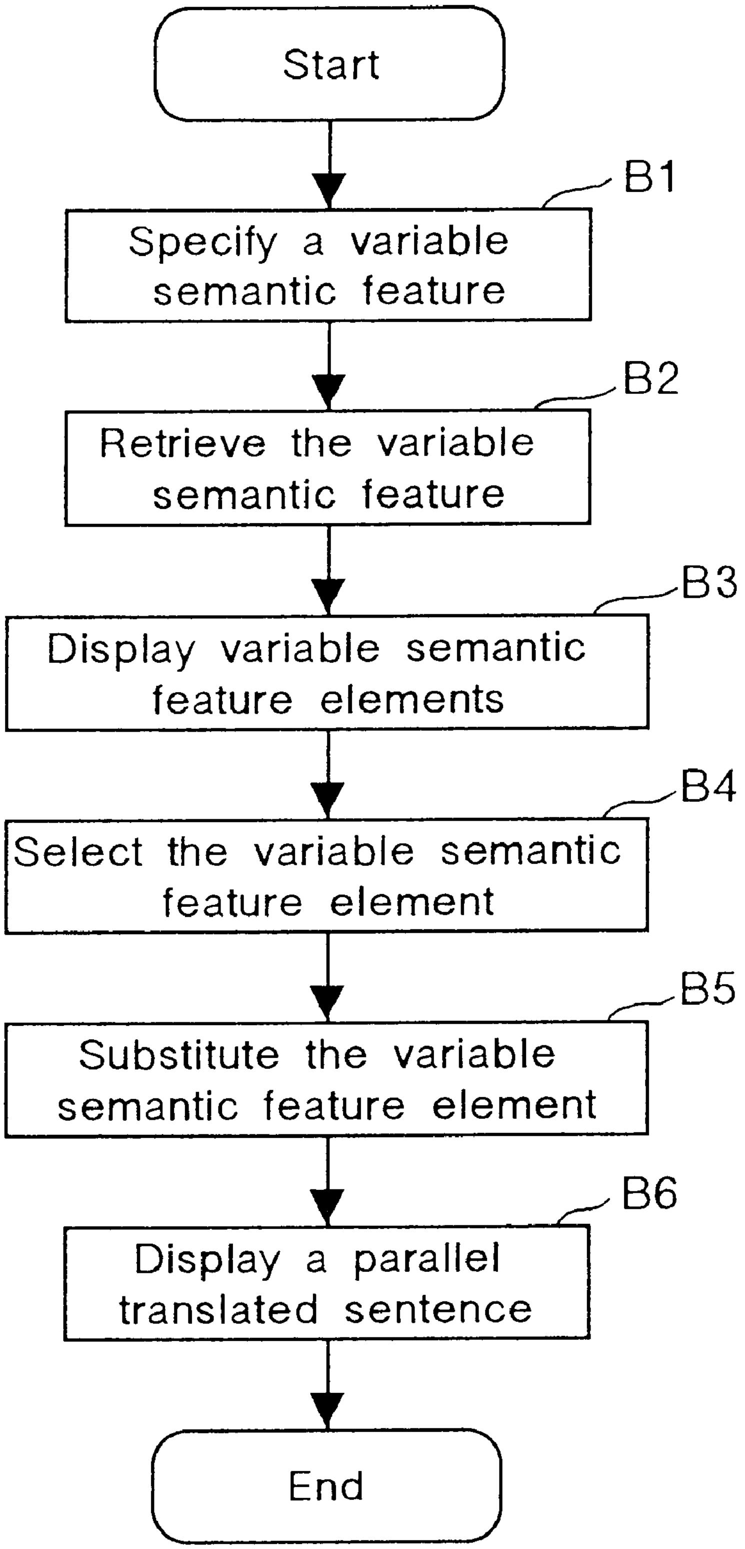
FIG. 5 is a flowchart showing procedure of a processing (2) according to the embodiment of the present invention.

The procedure of this processing is basically the same as the flowchart of FIG. 5 described above. A different processing is performed at Step E3.

Step E3: The control section 13 of the CPU 1 causes Japanese elements of the variable semantic feature stored at Step E2 to be displayed on the liquid crystal display 2 through the display driver 3 as shown in FIG. 16 (*c*). At this time, an element which is being inserted in the example sentence is set to an uppermost position. Now, the variable semantic feature element <San Francisco> is inserted in the example sentence. Accordingly, display is performed such that <San Francisco> is set to a first position as shown in FIG. 16 (*c*). FIGS. 16 (*a*) to 16 (*e*) show display of the screen in this example.

According to the fourth aspect of the present invention, a character is freely input to the variable semantic feature. More specifically, alphabet/numerals are freely input to the variable semantic feature. In order to implement this processing, it is necessary to add the description of the variable semantic feature dictionary 9. The description of the variable semantic feature dictionary 9 will be described below.

More specifically, a mark designating that input can be performed is attached to the corresponding variable semantic feature of the variable semantic feature dictionary 9 in order for the user to freely perform input to the variable semantic feature corresponding portion. This mark is represented by “@” attached to the right side of the name of the variable semantic feature, that is, “place name” in the following example.

| | |
|---|---|
| Place name @ | |
| < New York > | “ New York ” |
| < Chicago > | “ Chicago ” |
| < London > | “ London ” |
| < Oxford > | “ Oxford ” |

An implementing method is not restricted to the foregoing. For example, if the variable semantic feature of each example sentence of the parallel translation data base 7 is marked, the possibility of inputting the same variable semantic feature can be specified for each example sentence.

Figure 10:
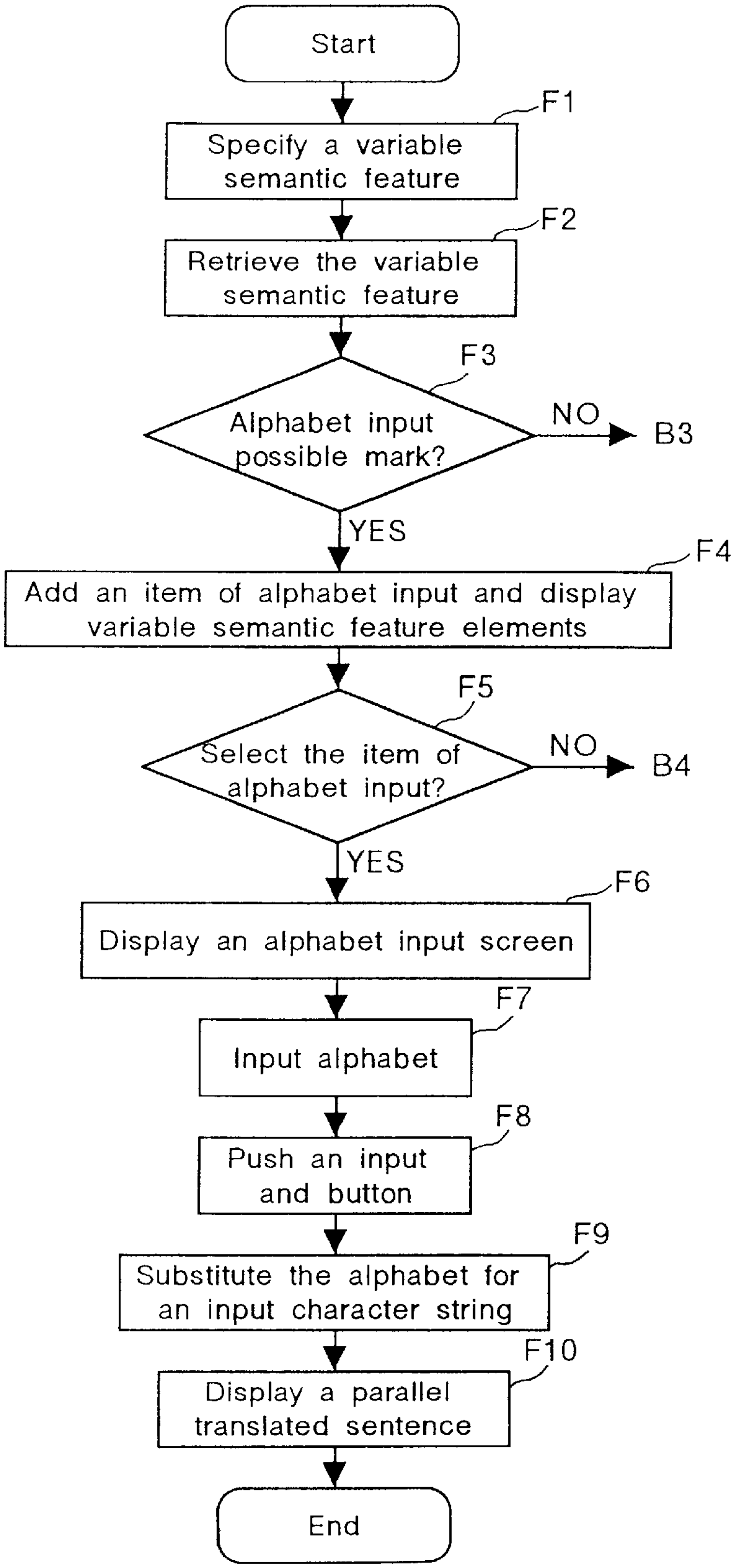
FIG. 10 is a flowchart showing procedure of a processing (7) according to the embodiment of the present invention.
Figure 11:
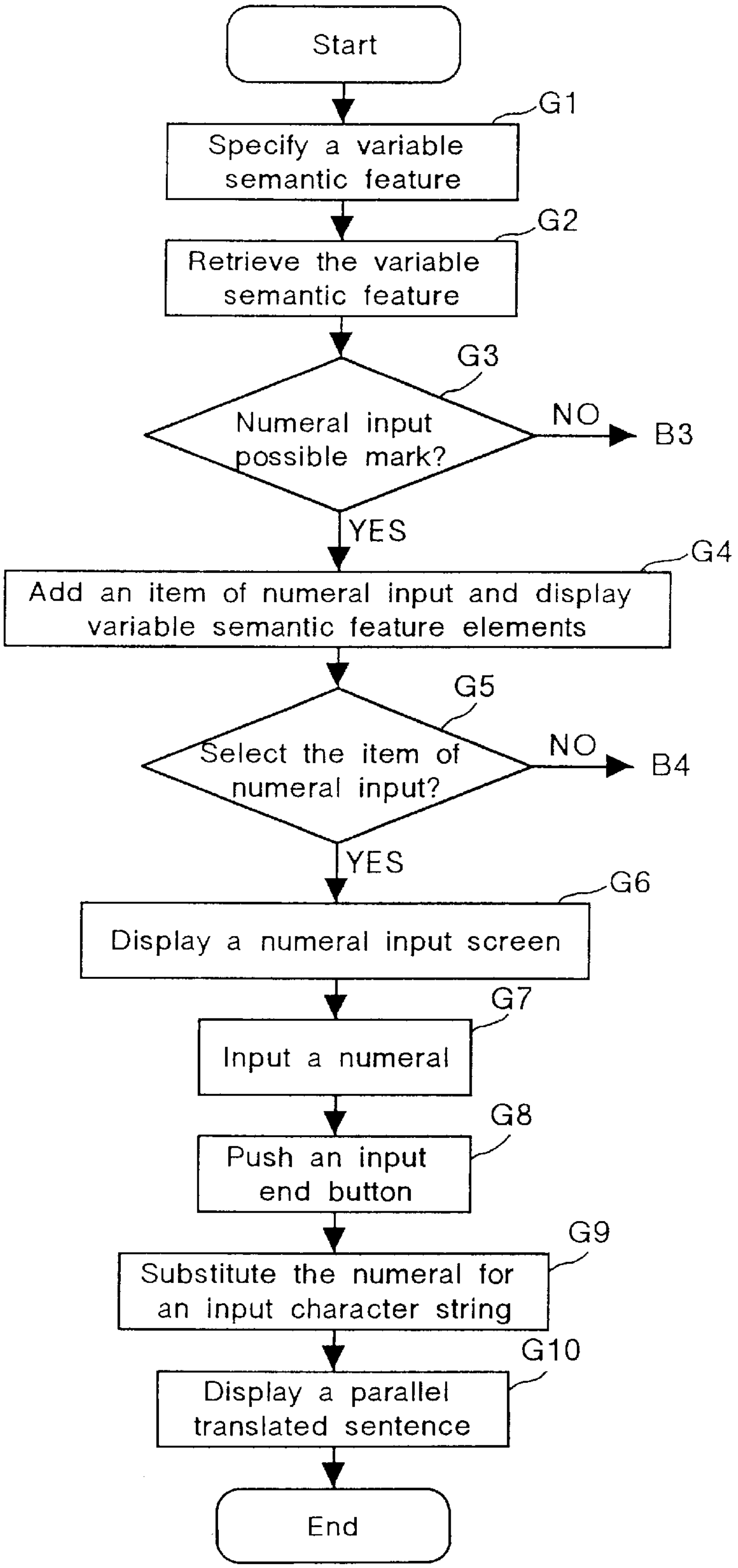
FIG. 11 is a flowchart showing procedure of a processing (8) according to the embodiment of the present invention.
Figure 17:
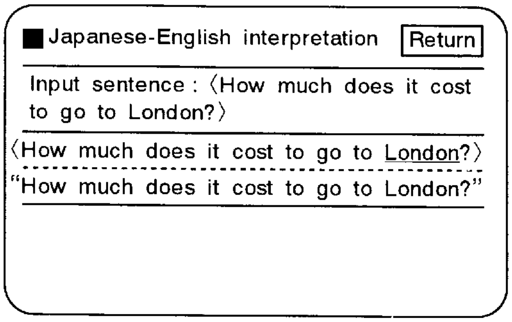
FIGS. 17 (*a*) to 17 (*f*) are diagrams showing a display example (7) of the screen according to the embodiment of the present invention.
Figure 17:
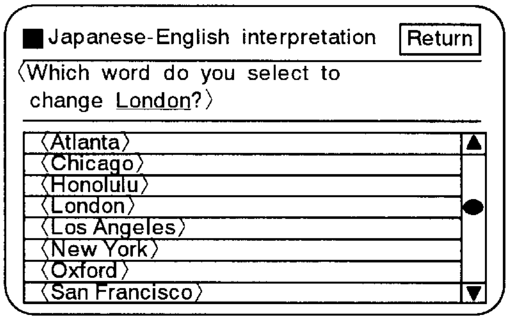
Figure 17:
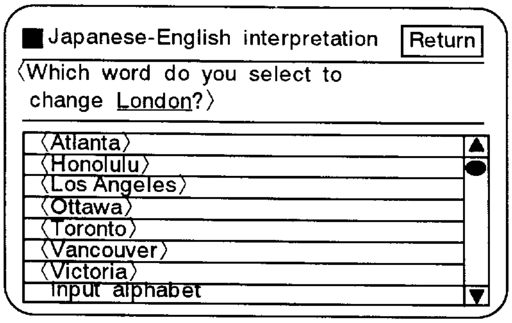
Figure 17:
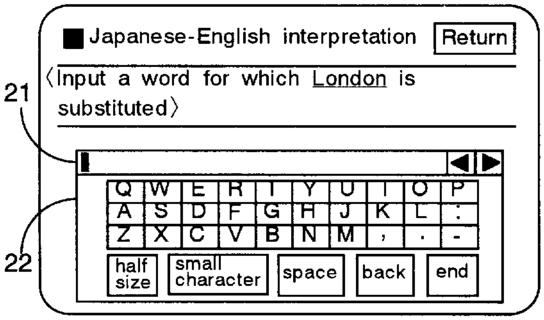
Figure 17:
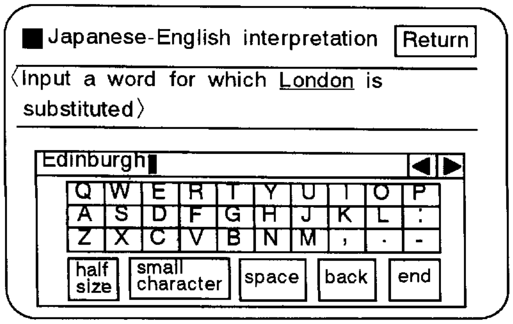
Figure 17:
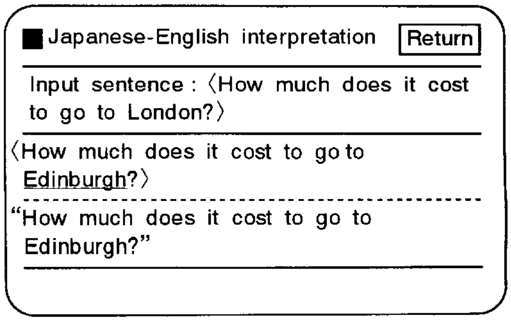

The operation will be described below with reference to a flowchart shown in FIG. 10. It is assumed that the user inputs <How much does it cost to go to London?> and a sentence <How much does it cost to go to London?> is retrieved and displayed. The case where <London> of this sentence is changed to “Edinburgh” will be described below as an example. FIGS. 17 (*a*) to 17 (*f*) show display of the screen in this example.

At Steps F1 and F2, the same processings as described above are performed.

Step F3: The retrieving section 11 of the CPU 1 detects that the mark designating that input can be performed is attached to the variable semantic feature stored at Step F2 or not. If so, the routine proceeds to Step F4. If not, the routine proceeds to Step B3 of the flowchart shown in FIG. 5, and processings are performed according to the flowchart shown in FIG. 5. Since the mark designating that input can be performed is attached to the {place name} variable semantic feature, the routine proceeds to Step F4.

Step F4: The control section 13 of the CPU 1 causes Japanese elements of the variable semantic feature stored at Step F2 to be displayed on the liquid crystal display 2 through the display driver 3 as shown in FIG. 17 (*b*). At this time, an item of <Input alphabet> is inserted below the last variable semantic feature element and is displayed. If the screen shown in FIG. 17 (*b*) is scrolled to the end, the screen shown in FIG. 17 (*c*) is obtained.

Step F5: When the user selects the item of <Input alphabet>, the routine proceeds to Step F6. The user touches the corresponding item by means of the pen 15 to perform the processing. The moment the user touches the same item by means of the pen 15, the control section 13 of the CPU 1 inverts a portion of <Input alphabet> on the liquid crystal display 2 through the display driver 3. If the user does not select the item of <Input alphabet>, the routine proceeds to Step B4 of the flowchart shown in FIG. 5 and processings are performed according to the flowchart shown in FIG. 5.

Step F6: When recognizing the selection of the item of <Input alphabet> through the input recognizing section 4, the control section 13 of the CPU 1 causes an input screen shown in FIG. 17 (*d*) to be displayed on the liquid crystal display 2 through the display driver 3.

The input screen has a display board 21 and a type-writer board 22 as shown in FIG. 17 (*d*). Each alphabet is input from the typewriter board 22 by touching using the pen 15. The input alphabet is displayed on the display board 21.

Step F7: The user inputs each alphabet by means of the pen 15 on the input screen shown in FIG. 17 (*d*). Input is performed by touching each alphabet of the type-writer board 22 shown in FIG. 17 (*d*). The input character is displayed on the display board 21 shown in FIG. 17 (*d*). It is assumed that the user inputs “Edinburgh”. FIG. 17 (*e*) shows an example of the screen obtained when input is completed.

Step F8: When the user pushes an [end] button on the input screen shown in FIG. 17 (*e*), the control section 13 of the CPU 1 causes a character string input to the display board 21 to be stored in the working memory 5. In this example, “Edinburgh” is stored in the working memory 5.

Step F9: The substituting section 12 of the CPU 1 substitutes the corresponding variable semantic feature element in the parallel translated example sentence stored in the working memory 5 for the input character stored at Step F8. The input character is stored in the working memory 5.

<How much does it cost to go to London?>

“How much is it to London?”

<London> is substituted for “Edinburgh”.

“How much does it cost to go to Edinburgh?”

While the alphabet has been input in this example, numerals, time and the like can also be input, for example.

The numerals can be input as follows:

| | |
|---|---|
| 1 | one |
| 2 | two |
| 3 | three |
| | . |
| | . |

Such a dictionary can be further provided for conversion.

According to the present invention, the variable semantic feature elements are hierarchically arranged and displayed in particular order based on the sorting reference when the user substitutes them. Consequently, it is possible to greatly reduce labor and time to search for the elements.

In addition, the character to be substituted can be inserted freely. Consequently, the prepared example sentence can be utilized effectively to obtain communication.

While the invention has been described in detail, the foregoing description is in all aspects illustrative and not restrictive. It is understood that numerous other modifications and variations can be devised without departing from the scope of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims:

What is claimed is:

1. A machine interpreter comprising:

a parallel translation data base for storing an example sentence of a first language and a corresponding translation of the example sentence of a second language;

a variable semantic feature dictionary for designating a variable word group of at least one word corresponding to a particular word group, of at least one word, of the example sentence, and for storing word groups of the first and second languages in pairs;

input means for inputting a request for retrieval from the parallel translation data base;

retrieving means for retrieving an example sentence and a translated sentence from the parallel translation data base based upon an input retrieval request;

display for displaying the example sentence and translated sentence retrieved from the parallel translation data base;

control means for arranging words of a variable word group in the variable semantic feature dictionary corresponding to the particular word group of the example sentence, and for causing the display to display the arranged words and a word group corresponding to the arranged words; and substituting means for substituting a translated word of the arranged words, equivalent to a word requested by the input means, for the particular word of the example sentence.

2. The machine interpreter as defined in claim 1, wherein the control means arranges the words of the variable word group in the variable semantic feature dictionary corresponding to the particular word of the example sentence, and causes the display to display the words of the variable word group in a particular order.

3. The machine interpreter as defined in claim 1, wherein the control means arranges the words of the variable word group in the variable semantic feature dictionary corresponding to the particular word of the example sentence, and causes the display to display the words of the variable word group by setting a word identical to the particular word of the example sentence which is being displayed.

4. The machine interpreter as defined in claim 1, wherein the control means further controls the display to display the words of the variable word group in a column for selection and inputting to be substituted for the particular word of the example sentence, and wherein the substituting means further substitutes the selected word of the character string for the particular word of the example sentence when a word of the displayed column is selected by the input means.

5. The machine interpreter as defined in claim 2 or 3, wherein the control means further controls the display to invert and display a variable word group and a word selected by the input means from the words of the variable word group displayed by the display.

6. The machine interpreter as defined in claim 2, wherein the particular order is alphabetical.

7. The machine interpreter of claim 1, wherein the control means further classifies the words of the variable word group into categories based on a classification standard, the input means selects a category, and the display displays words in the selected category together with a name of the selected category in a hierarchical structure.

8. A machine interpreter comprising:

a parallel translation data base for registering an example sentence described in a first language and a translated sentence of the example sentence described in a second language to correspond to each other;

a variable semantic feature dictionary for causing a variable word group to correspond to a particular word of the example sentence for each semantic feature, and for storing the first and second languages in pairs;

input means for inputting a request for retrieval of the parallel translation data base, or an instruction to substitute a word;

retrieving means for retrieving the parallel translation data base by the request for retrieval from the input means;

display means for displaying an example sentence and a translated sentence of the parallel translation data base;

control means for sorting a variable word group in the variable semantic feature dictionary corresponding to the particular word of the example sentence based on a sort item of each variable semantic feature, and causing the display means to hierarchically display the sort item and a word group belonging to the sort item; and substituting means for substituting a translated word equivalent to a desired word selected by the input means for the particular word of the example sentence.

* * * * *

UNITED STATES PATENT AND TRADEMARK OFFICE

CERTIFICATE OF CORRECTION

PATENT NO. : 6,067,510
DATED : May 23, 2000
INVENTOR(S) : Kozue Kimura, Yukihiro kubo, Satoshi Onishi It is certified that error appears in the above-identified patent and that said Letters Patent is hereby corrected as shown below:

Change item [22] "March 19, 1997" to -- March 18, 1997 --.

Signed and Sealed this

Eleventh Day of September, 2001

*Attest:*

Nicholas P. Godici

NICHOLAS P. GODICI

*Attesting Officer* *Acting Director of the United States Patent and Trademark Office*